(12) United States Patent
Osada

(10) Patent No.: US 11,365,984 B2
(45) Date of Patent: Jun. 21, 2022

(54) ABSOLUTE ENCODER

(71) Applicant: MINEBEA MITSUMI Inc., Nagano (JP)

(72) Inventor: Yasuo Osada, Saitama (JP)

(73) Assignee: MINEBEA MITSUMI Inc., Nagano (JP)

(*) Notice: Subject to any disclaimer, the term of this patent is extended or adjusted under 35 U.S.C. 154(b) by 69 days.

(21) Appl. No.: 16/626,442

(22) PCT Filed: Jun. 28, 2018

(86) PCT No.: PCT/JP2018/024648
§ 371 (c)(1),
(2) Date: Dec. 24, 2019

(87) PCT Pub. No.: WO2019/009186
PCT Pub. Date: Jan. 10, 2019

(65) Prior Publication Data
US 2020/0132507 A1 Apr. 30, 2020

(30) Foreign Application Priority Data
Jul. 4, 2017 (JP) .............................. JP2017-131231

(51) Int. Cl.
*G01D 5/14* (2006.01)
(52) U.S. Cl.
CPC ..................................... *G01D 5/14* (2013.01)
(58) Field of Classification Search
CPC ....................................................... G01D 5/14
See application file for complete search history.

(56) References Cited

U.S. PATENT DOCUMENTS 6,424,928 B1* 7/2002 Elliott ...................... G01D 3/08
702/113
6,630,823 B2* 10/2003 Tateishi ................. B62D 15/02
324/207.25

(Continued)

FOREIGN PATENT DOCUMENTS

| DE | 10002331 | 8/2001 |
|---|---|---|
| EP | 1391696 | 2/2004 |
| EP | 2749839 | 7/2014 |
| JP | H04-096019 U | 8/1992 |
| JP | 2002-131049 | 5/2002 |
| JP | 2002-340619 | 11/2002 |

(Continued)

OTHER PUBLICATIONS

Extended European Search Report dated Dec. 16, 2020 (EP Patent Application No. 18827360.1).

(Continued)

*Primary Examiner* — Walter L Lindsay, Jr.
*Assistant Examiner* — Milton Gonzalez
(74) *Attorney, Agent, or Firm* — IPUSA, PLLC

(57) ABSTRACT

The present invention provides an absolute encoder suitable for reduction in thickness. An absolute encoder, for determining a rotation amount of a main spindle that rotates a plurality of revolutions, includes a first drive gear configured to rotate in accordance with rotation of the main spindle; a first driven gear that engages with the first drive gear; a second drive gear configured to rotate in accordance with rotation of the first driven gear; a second driven gear that engages with the second drive gear; and an angular sensor configured to detect a rotation angle at which a second rotating body is rotated in accordance with rotation of the second driven gear.

5 Claims, 19 Drawing Sheets

(56) References Cited

U.S. PATENT DOCUMENTS

| | | | |
|---|---|---|---|
| 7,017,274 B2 | 3/2006 | Stobbe | |
| 7,424,858 B2 * | 9/2008 | Matsuda | G01D 5/04 |
| | | | 114/144 E |
| 7,584,818 B2 * | 9/2009 | Choi | G01D 5/363 |
| | | | 180/444 |
| 7,637,347 B2 * | 12/2009 | Choi | B62D 15/0215 |
| | | | 180/444 |
| 9,097,559 B2 * | 8/2015 | Ronnat | B62D 15/0245 |
| 9,316,482 B2 * | 4/2016 | Delbaere | G01D 5/2458 |
| 2004/0007067 A1 | 1/2004 | Meyer et al. | |
| 2004/0256545 A1 | 12/2004 | Stobbe | |
| 2013/0257419 A1 | 10/2013 | Greenwell et al. | |
| 2014/0278223 A1 | 9/2014 | Zhou et al. | |
| 2016/0153527 A1 | 6/2016 | Okada et al. | |
| 2017/0059369 A1 | 3/2017 | Ootake et al. | |

FOREIGN PATENT DOCUMENTS

| | | |
|---|---|---|
| JP | 2004-077483 | 3/2004 |
| JP | 2006-098234 | 4/2006 |
| JP | 2014-147262 | 8/2014 |
| JP | 2016-105676 | 6/2016 |
| JP | 2017-044639 | 3/2017 |

OTHER PUBLICATIONS

International Search Report for PCT/JP2018/024648 dated Sep. 18, 2018.

Office Action dated Nov. 9, 2021 with respect to the corresponding Japanese Patent Application No. 2020-181207.

* cited by examiner

FIG.20

| SPEC No. | MAIN SPINDLE TYPE | | ANGULAR SENSOR | | | OUTLINE SPEC |
|---|---|---|---|---|---|---|
| | HOLLOW/ SOLID | SINGLE SHAFT/ DOUBLE SHAFT | ANGULAR SENSOR Sq | ANGULAR SENSOR Sp | ANGULAR SENSOR Sr | |
| 1 | HOLLOW | DOUBLE SHAFT | ABSENCE | PRESENCE | ABSENCE | HOLLOW, DOUBLE SHAFT/MEDIUM RESOLUTION/MEDIUM RANGE |
| 2 | HOLLOW | DOUBLE SHAFT | ABSENCE | PRESENCE | PRESENCE | HOLLOW, DOUBLE SHAFT/MEDIUM RESOLUTION/WIDE RANGE |
| 3 | SOLID | DOUBLE SHAFT | ABSENCE | PRESENCE | ABSENCE | SOLID, DOUBLE SHAFT/MEDIUM RESOLUTION/MEDIUM RANGE |
| 4 | SOLID | DOUBLE SHAFT | ABSENCE | PRESENCE | PRESENCE | SOLID, DOUBLE SHAFT/MEDIUM RESOLUTION/WIDE RANGE |
| 5 | HOLLOW | SINGLE SHAFT | ABSENCE | PRESENCE | ABSENCE | HOLLOW, SINGLE SHAFT/MEDIUM RESOLUTION/MEDIUM RANGE |
| 6 | HOLLOW | SINGLE SHAFT | ABSENCE | PRESENCE | PRESENCE | HOLLOW, SINGLE SHAFT/MEDIUM RESOLUTION/WIDE RANGE |
| 7 | SOLID | SINGLE SHAFT | ABSENCE | PRESENCE | ABSENCE | SOLID, SINGLE SHAFT/MEDIUM RESOLUTION/MEDIUM RANGE |
| 8 | SOLID | SINGLE SHAFT | ABSENCE | PRESENCE | PRESENCE | SOLID, SINGLE SHAFT/MEDIUM RESOLUTION/WIDE RANGE |
| 9 | HOLLOW | SINGLE SHAFT | PRESENCE | PRESENCE | ABSENCE | HOLLOW, SINGLE SHAFT/HIGH RESOLUTION/MEDIUM RANGE |
| 10 | HOLLOW | SINGLE SHAFT | PRESENCE | PRESENCE | PRESENCE | HOLLOW, SINGLE SHAFT/HIGH RESOLUTION/WIDE RANGE |
| 11 | SOLID | SINGLE SHAFT | PRESENCE | PRESENCE | ABSENCE | SOLID, SINGLE SHAFT/HIGH RESOLUTION/MEDIUM RANGE |
| 12 | SOLID | SINGLE SHAFT | PRESENCE | PRESENCE | PRESENCE | SOLID, SINGLE SHAFT/HIGH RESOLUTION/WIDE RANGE |

ABSOLUTE ENCODER

TECHNICAL FIELD

The present invention relates to an absolute encoder for determining a rotation amount of an input shaft.

BACKGROUND ART

With respect to various control mechanical devices, rotary encoders have been known to be used for detecting a position of a movable element or an angle at which a movable element is situated. Such encoders include an incremental encoder for detecting a relative position or angle; and an absolute encoder for detecting an absolute position or angle. For example, Patent document 1 discloses an absolute type rotary encoder for digitally measuring, as an absolute amount, a rotation amount of: a rotation shaft used in motion control of an automatic control device, a robotic device, or the like; or a rotation shaft for power transmission used for opening and closing of a valve; or the like.

CITATION LIST

[Patent Document]
Patent Document 1: Japanese Unexamined Utility Model Application Publication No. 4-96019

SUMMARY OF INVENTION

The absolute encoder disclosed in Patent document 1 includes components such as a rotary disk, a slit, a light emitting element, and a light receiving element, the components being stacked in an axial direction of a shaft. In this case, since a dimension of each component is increased with respect to an axial direction, a dimension of the absolute encoder with respect to the axial direction is increased, which results in a problem of having difficulty in thinning. In order to thin an absolute encoder, thinning of each component might be considered. However, if the components are formed to be thinned, strength is decreased and thus breakage may be more likely to occur in a case of being subject to vibration or impact.

In light of the problem described above, the present invention is made, and an objective of the present invention is to provide an absolute encoder that is suitable for reduction in thickness.

In order to solve the problem, an absolute encoder in one manner of the present invention is an absolute encoder for determining a rotation amount of a main spindle that rotates a plurality of revolutions, the absolute encoder including; a first drive gear configured to rotate in accordance with rotation of the main spindle; a first driven gear that engages with the first drive gear; a second drive gear configured to rotate in accordance with rotation of the first driven gear; a second driven gear that engages with the second drive gear; and an angular sensor configured to detect a rotation angle at which a second rotating body is rotated in accordance with rotation of the second driven gear.

In such a manner, with respect to the absolute encoder, a rotation angle at which the second driven gear is rotated can be detected by an angular sensor.

Another manner of the present invention is also directed to an absolute encoder. This absolute encoder is an absolute encoder for determining a rotation amount of a main spindle that rotates a plurality of revolutions, the absolute encoder including; an intermediate rotating body configured to rotate at a first reduction ratio, in accordance with rotation of the main spindle; a second rotating body configured to rotate at a second reduction ratio, in accordance with rotation of the intermediate rotating body; and an angular sensor configured to detect a rotation angle at which the second rotating body is rotated. An axial line of rotation of the main spindle is skew with respect to an axial line of rotation of the intermediate rotating body, and is set to be parallel to an axial line of rotation of the second rotating body.

Yet another manner of the present invention is also directed to an absolute encoder. This absolute encoder is an absolute encoder for determining a rotation amount of a main spindle that rotates a plurality of revolutions, the absolute encoder including; a reduction mechanism including a worm speed-changing mechanism, the reduction mechanism being configured to rotate a magnet in accordance with rotation of the main spindle; and an angular sensor configured to detect a rotation angle at which the magnet is rotated, though magnetic poles of the magnet. An axial line of rotation of the main spindle is parallel to an axial line of rotation of the magnet.

Note that any combination of the above components; or replacement of components or expressions of the present invention with respect to a method, a device, a system, and the like, is also effective in manners of the present invention.

Advantageous Effects of Invention

According to the present invention, it is possible to provide an absolute encoder that is suitable for reduction in thickness.

BRIEF DESCRIPTION OF DRAWINGS

FIG. 20 is a classification table for specifications of a given encoder according to each embodiment.

DESCRIPTION OF THE PREFERRED EMBODIMENTS

Figure 1:
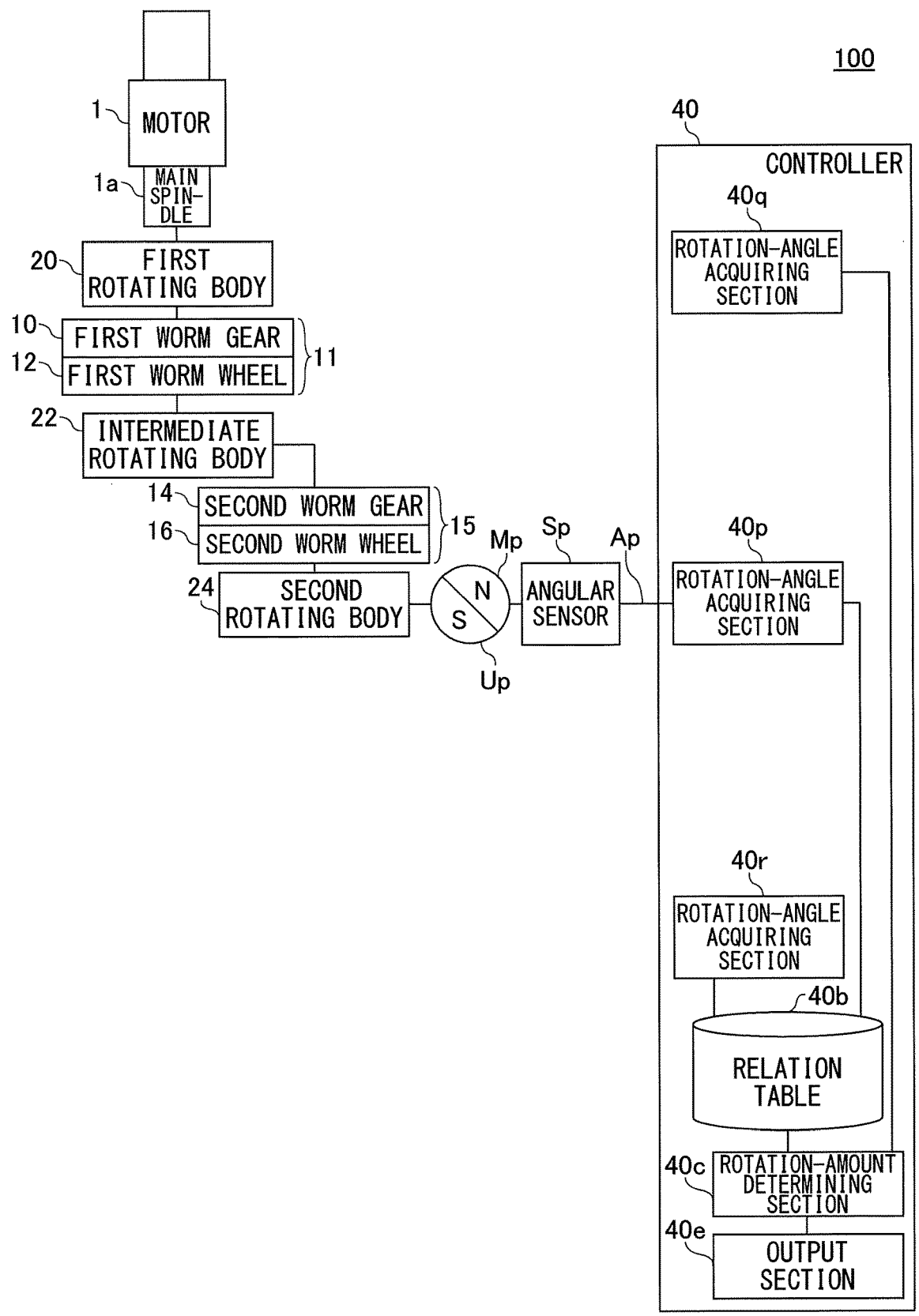
FIG. 1 is a block diagram for explaining an encoder according to a first embodiment of the present invention.

Hereinafter, preferred embodiments of the present invention will be described with reference to drawings. In each embodiment and modification, the same reference numerals denote same or similar components, or members; accordingly, duplicative explanations will be omitted as appropriate.

Additionally, in each drawing, for ease of understanding, members are indicated to be enlarged or reduced in size as appropriate. In each drawing, some of unimportant members will be omitted from the viewpoint of describing the embodiments.

Although terms including ordinal numbers, such as first, and second, are used to describe various components, these terms are only used for purpose of distinguishing one component from another. The components are not limited by a given term.

First Embodiment

A first embodiment will be described with reference to FIG. 1. FIG. 1 is a block diagram for explaining an absolute encoder 100 according to the first embodiment. The absolute encoder 100 is an absolute encoder that determines a rotation amount of a main spindle 1a of a motor 1, the main spindle rotating a plurality of revolutions. The absolute encoder 100 includes the main spindle 1a; a first rotating body 20; a first worm gear 10; a first worm wheel 12; and an intermediate rotating body 22. The absolute encoder 100 includes a second worm gear 14, a second worm wheel 16, and a second rotating body 24. The absolute encoder 100 includes a magnet Mp, an angular sensor Sp, and a controller 40.

The absolute encoder 100 uses a principle of acquiring respective rotation angles at which the first rotating body 20 and the second rotating body 24 are rotated at a reduced speed in accordance with rotation of the main spindle 1a of the motor 1 to determine a rotation amount of the main spindle 1a that rotates a plurality of revolutions (hereinafter referred to as multiple revolutions). By dividing a rotation angle at which the second rotating body 24 is rotated, by the reduction ratio, a rotation amount of the main spindle 1a can be determined. In this description, a determinable range of rotation amounts of the main spindle 1a increases in inverse proportion to a reduction ratio. For example, when a reduction ratio between the main spindle 1a and the second rotating body 24 is 1/100, a rotation amount corresponding to 100 revolutions can be determined. On the other hand, a resolution with respect to a determinable rotation amount of the main spindle 1a decreases in inverse proportion to a reduction ratio. For example, when a reduction ratio is 1/100, a resolution of 0.1° in a case of a reduction ratio of 1 is decreased to 10°.

The absolute encoder 100 is an absolute encoder that is capable of selecting a range of rotation amounts; and a resolution, in accordance with an intended use. The absolute encoder 100 can improve a balance between cost and performance. A specific configuration will be described below.

The main spindle 1a is an output shaft of the motor 1 and is an input shaft for bringing rotation into the absolute encoder 100. The first rotating body 20 is fixed to the main spindle 1a, and is rotatably supported by a bearing member of the motor 1, so as to be integrated with the main spindle 1a. In order to rotate in accordance with rotation of the main spindle 1a, the first worm gear 10 is disposed on an outer periphery of the first rotating body 20, such that center axes of the first worm gear and the first rotating body coincide. The first worm wheel 12 engages with the first worm gear 10 and is disposed to rotate in accordance with rotation of the first worm gear 10. The first worm wheel 12 is disposed on an outer periphery of the intermediate rotating body 22, such that respective center axes coincide. An axial angle between the first worm wheel 12 and the first worm gear 10 is set to 90°.

An outer diameter of the first worm wheel 12 is not particularly restricted. In an example of this figure, the outer diameter of the first worm wheel 12 is set to be smaller than an outer diameter of the first worm gear 10. Compared to a case where the outer diameter of the first worm wheel 12 is increased, a dimension of the encoder in an axial direction of the main spindle 1a can be suppressed to be decreased.

The second worm gear 14 rotates in accordance with rotation of the first worm wheel 12. The second worm gear 14 is disposed on an outer periphery of the intermediate rotating body 22, such that center axes of the second worm gear and the intermediate rotating body coincide. The second worm wheel 16 engages with the second worm gear 14 and is provided to rotate in accordance with rotation of the second worm gear 14. The second worm wheel 16 is disposed on an outer periphery of the second rotating body 24, such that center axes of the second worm wheel and the second rotating body coincide. An axial angle between the second worm wheel 16 and the second worm gear 14 is set to 90°. An axial line of rotation of the second worm wheel 16 is parallel to an axial line of rotation of the first worm gear 10.

The angular sensor Sp detects a rotation angle at which the second worm wheel 16 is rotated. The magnet Mp is fixed to an upper surface of the second rotating body 24, such that center axes of the magnet and the second rotating body coincide. On an upper surface of the magnet Mp, two magnetic poles Up are disposed in a direction perpendicular to an axial line of rotation of the second rotating body 24. The angular sensor Sp is provided over the magnet Mp, such that a lower surface of the angular sensor is opposed to a thrust direction through a gap. As an example, the angular sensor Sp is fixed to a substrate that is supported by a housing (not shown) or the like of the absolute encoder 100. The angular sensor Sp detects each magnetic pole Up; and identifies a rotation angle at which the magnet Mp is rotated, through each magnetic pole Up to output it to the controller 40. The controller 40 determines a rotation amount of the main spindle 1a, based on a rotation angle acquired from the angular sensor Sp, and outputs it. As an example, the controller 40 may output a rotation amount of the main spindle 1a, as a digital signal.

The number of threads of the first worm gear 10 is 1, and the number of teeth of the first worm wheel 12 is 20. In other words, the first worm gear 10 and the first worm wheel 12 constitute a first worm speed-changing mechanism 11 of which a reduction ratio is 1/20. When the first worm gear 10 rotates 20 revolutions, the first worm wheel 12 rotates once.

The first worm wheel 12 rotates the intermediate rotating body 22, and the intermediate rotating body 22 rotates the second worm gear 14. In such a manner, when the first worm wheel 12 rotates once, the intermediate rotating body 22 and the second worm gear 14 each rotate once.

The number of threads of the second worm gear 14 is 5, and the number of teeth of the second worm wheel 16 is 25. In other words, the second worm gear 14 and the second worm wheel 16 constitute a second worm speed-changing mechanism 15 of which a reduction ratio is 1/5. When the second worm gear 14 rotates 5 revolutions, the second worm wheel 16 rotates once. The second worm wheel 16 rotates the second rotating body 24 and the magnet Mp. With action of each gear and each rotating body being taken, when the main spindle 1a rotates 100 revolutions, the intermediate rotating body 22 rotates 5 revolutions and the magnet Mp rotates once. In other words, the angular sensor Sp can determine a rotation amount of the main spindle 1a that rotates 100 revolutions.

The absolute encoder 100 in such a configuration can determine a rotation amount of the main spindle 1a. As an example, when the main spindle 1a rotates once, the second rotating body 24 and the magnet Mp each rotate one-hundredth, i.e., by 3.6°. For this reason, when a rotation angle at which the second rotating body 24 is rotated is equal to or lower than 3.6°, a rotation amount of the main spindle 1a that has rotated by less than or equal to a single revolution can be determined.

Second Embodiment

Figure 2:
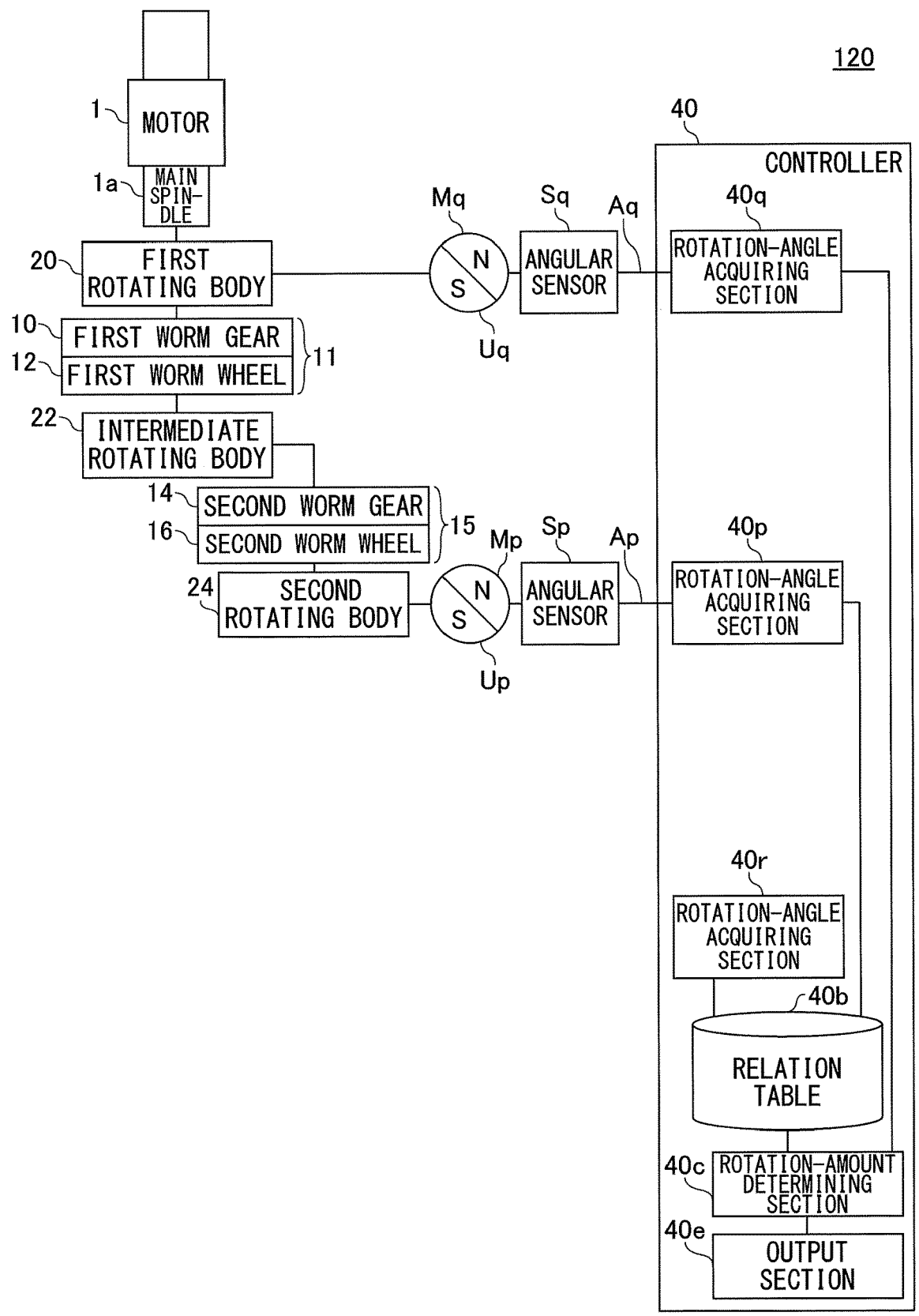
FIG. 2 is a block diagram for explaining an encoder according to a second embodiment of the present invention.

An encoder 120 according to a second embodiment will be described with reference to FIG. 2. FIG. 2 is a block diagram for explaining the encoder 120 according to the second embodiment. The encoder 120 is an absolute encoder that determines a rotation amount of a main spindle 1a of a motor 1, the main spindle 1a rotating a plurality of revolutions. The encoder 120 further includes an angular sensor Sq and a magnet Mq, unlike the absolute encoder 100 according to the first embodiment. Other configurations are the same as those described above. Duplicate explanations will be omitted for configurations that have been described in the first embodiment, and the configuration that differs will be described.

The magnet Mq is fixed to an upper surface of a first rotating body 20, such that center axes of the magnet and the first rotating body coincide. On an upper surface of the magnet Mq, two magnetic poles Uq are disposed in a direction perpendicular to an axial line of rotation of the first rotating body 20. The angular sensor Sq is disposed over the magnet Mq, such that a lower surface of the angular sensor is opposed to a thrust direction, through a gap. As an example, the angular sensor Sq is fixed to a substrate in which an angular sensor Sp is fixed on a same surface. The angular sensor Sq detects each magnetic pole Up; identifies a rotation angle at which the magnet Mp is rotated, through each magnetic pole Up, the rotation angle corresponding to a rotation angle at which the main spindle 1a is rotated; and outputs it to the controller 40. The controller 40 identifies a rotation angle at which the main spindle 1a is rotated, based on a rotation angle acquired from the angular sensor Sq. A resolution of rotation angles at which the main spindle 1a is rotated, corresponds to a resolution of the angular sensor Sq.

The encoder 120 in such a configuration determines a rotation amount of the main spindle 1a that rotates a plurality of revolutions, in accordance with rotation angles detected by the angular sensor Sp, as well as enabling to determine a rotation angle at which the main spindle 1a is rotated, in accordance with a given rotation angle detected by the angular sensor Sq. As a result, a determinable range of rotation amounts of the main spindle 1a can be increased, as well as improvements in resolution of determinable rotation angles at which the main spindle is rotated.

Third Embodiment

Figure 3:
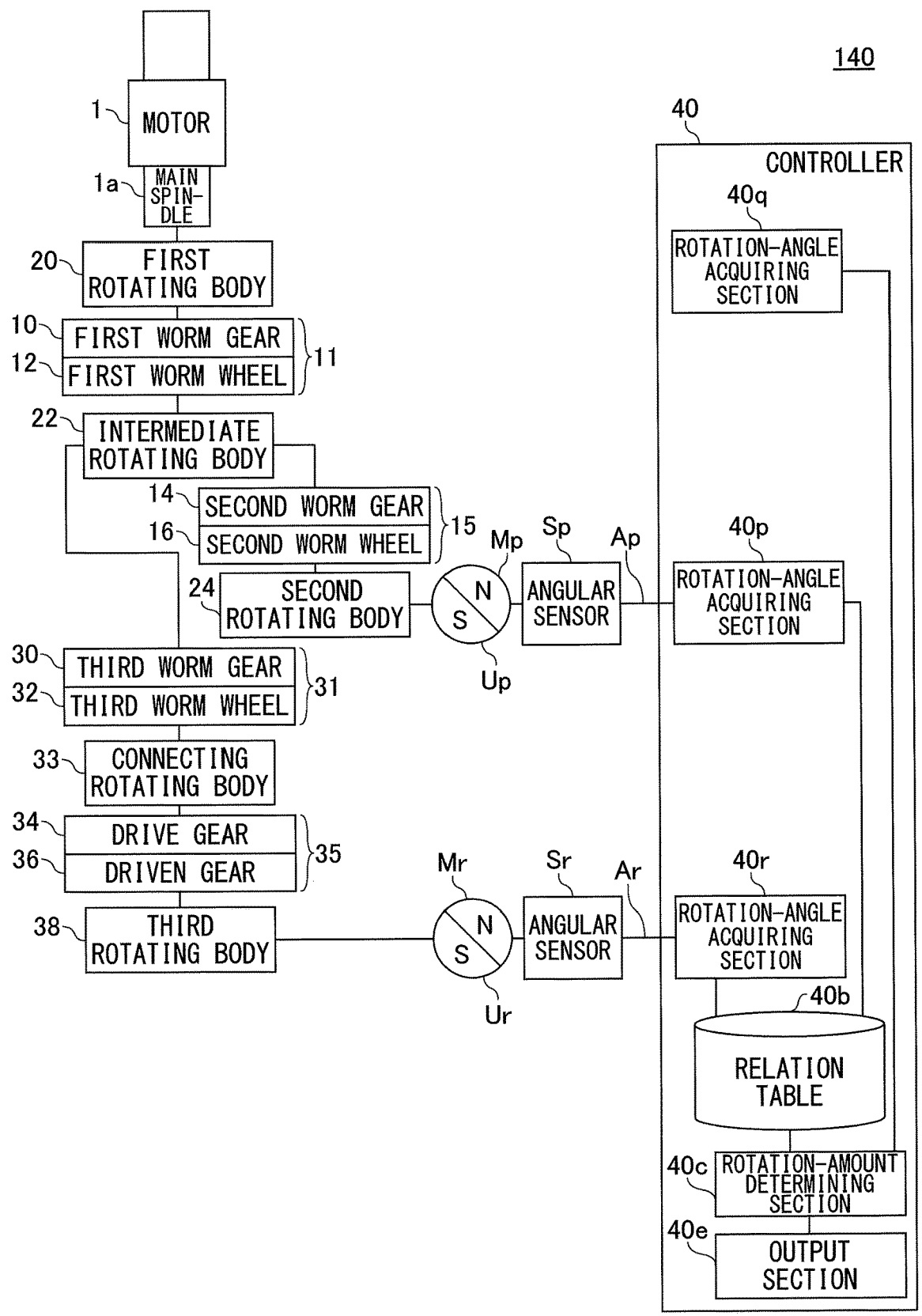
FIG. 3 is a block diagram for explaining an encoder according to a third embodiment of the present invention.

An encoder 140 according to a third embodiment will be described with reference to FIG. 3. FIG. 3 is a block diagram for explaining the encoder 140 according to the third embodiment. The encoder 140 is an absolute encoder that determines a rotation amount of a main spindle 1a of a motor 1, the main spindle 1a rotating a plurality of revolutions. Unlike the absolute encoder 100 according to the first embodiment, the encoder 140 further includes a third worm gear 30; a third worm wheel 32; a connecting rotating body 33; a driven gear 36; a third rotating body 38; a magnet Mr; and an angular sensor Sr. Other configurations are the same as those described above. Duplicate explanations will be omitted for configurations that have been described in the first embodiment, and the configuration that differs will be described.

The third worm gear 30 rotates in accordance with rotation of a first worm wheel 12. The third worm gear 30 is disposed on an outer periphery of an intermediate rotating body 22, such that center axes of the third worm gear and the intermediate rotating body coincide. The third worm wheel 32 engages with the third worm gear 30 and is provided to rotate in accordance with rotation of the third worm gear 30. The third worm wheel 32 is disposed on an outer periphery of the connecting rotating body 33, such that center axes of the third worm wheel and the connecting rotating body coincide. An axial angle between the third worm wheel 32 and the third worm gear 30 is set to 90°. An axial line of rotation of the third worm wheel 32 is parallel to an axial line of rotation of the first worm gear 10.

The drive gear 34 is fixed to an outer periphery of the connecting rotating body 33, such that center axes of the drive gear and the third worm wheel coincide. The drive gear 34 rotates integrally in accordance with rotation of the third worm wheel 32. The driven gear 36 engages with the drive gear 34, and rotates in accordance with rotation of the drive gear 34. The third rotating body 38 is fixed to the driven gear 36, such that center axes of the third rotating body and the driven gear coincide. The third rotating body 38 rotates integrally in accordance with rotation of the driven gear 36. An axial line of rotation of the third rotating body 38 is parallel to an axial line of rotation of the first rotating body 20.

The number of threads of the third worm gear 30 is 1, and the number of teeth of the third worm wheel 32 is 30. These constitute a third worm speed-changing mechanism 31 of which a reduction ratio is 1/30. When the third worm gear 30 and the immediate rotating body 22 integrally rotate 30 revolutions, the third worm wheel 32 rotates once. In other words, when the main spindle 1a rotates 600 revolutions, the third worm wheel 32 rotates once. The drive gear 34 is a spur gear of which the number of teeth is 24, and the driven gear 36 is a spur gear of which the number of teeth is 40. These configure a reduction mechanism 35 of which a reduction ratio is 3/5. In other words, when the main spindle 1a rotates 1000 revolutions, the driven gear 36 and the third rotating body 38 integrally rotate once.

The angular sensor Sr detects a rotation angle at which the driven gear 36 is rotated. The magnet Mq is fixed to an upper surface of the third rotating body 38, such that center axes of the magnet and the third rotating body coincide. On an upper surface of the magnet Mg, two magnetic poles Ur are disposed in a direction perpendicular to an axial line of rotation of the third rotating body 38. The angular sensor Sr is disposed over the magnet Mr, such that a lower surface of the angular sensor is opposed to a thrust direction, through a gap. As an example, the angular sensor Sr is fixed to a substrate in which an angular sensor Sp is fixed on a same surface. The angular sensor Sr detects each magnetic pole Ur; identifies a rotation angle at which the magnet Mp is rotated, through each magnetic pole Ur, the rotation angle corresponding to a rotation angle at which the third rotating body 38 and the driven gear 36 are each rotated; and outputs it to the controller 40.

With action of each gear and each rotating body being taken, when the main spindle 1a rotates 1000 revolutions, the third rotating body 38, the driven gear 36, and the magnet Mr each rotate once. In other words, the angular sensor Sr can determine a rotation amount of the main spindle 1a that rotates 1000 revolutions. The controller 40 determines a rotation amount of the main spindle 1a based on respective rotation angles acquired from the angular sensor Sp and the angular sensor Sr. As an example, when the main spindle 1a rotates once, the driven gear 36 and the magnet Mr each rotate one-thousandth, i.e., by 0.36°. For this reason, when a rotation angle at which the driven gear 36 is rotated is equal to or lower than 0.36°, a rotation amount of the main spindle 1a that has rotated by less than or equal to a single revolution can be determined.

In such a configuration, the encoder 140 according to the third embodiment determines a rotation amount of the main spindle 1a that rotates a plurality of revolutions, in accordance with rotation angles detected by the angular sensor Sr. Thereby, a determinable range of rotation amounts of the main spindle 1a can be further increased. The encoder 140 determines a rotation amount of the main spindle 1a that rotates a plurality of revolutions, in accordance with rotation angles detected by the angular sensor Sp. Thereby, reductions in resolution of determinable rotation amounts of the main spindle 1a can be suppressed, compared to a case where the angular sensor Sp is not included.

As a result, a determinable range of rotation amounts of the main spindle 1a is further increased, as well as enabling to compensate decreased resolution of determinable rotation angles at which the main spindle is rotated.

Fourth Embodiment

Figure 4:
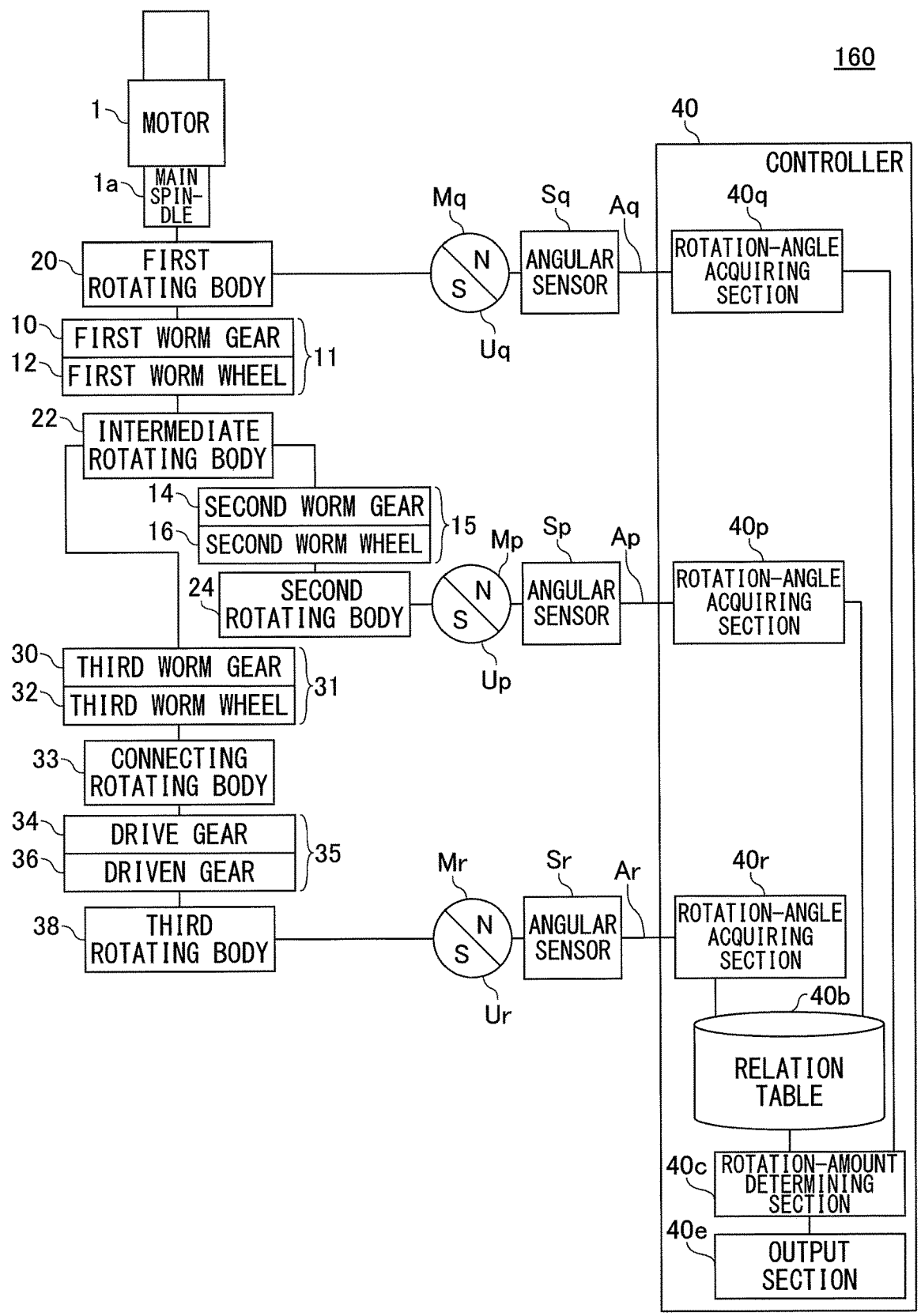
FIG. 4 is a block diagram for explaining an encoder according to a fourth embodiment of the present invention.

An encoder 160 according to a fourth embodiment will be described with reference to FIG. 4. FIG. 4 is a block diagram for explaining the encoder 160 according to the fourth embodiment. The encoder 160 is an absolute encoder that determines a rotation amount of a main spindle 1a of a motor 1, the main spindle 1a rotating a plurality of revolutions. Unlike the absolute encoder 100 according to the first embodiment, the encoder 160 further includes an angular sensor Sq; a magnet Mq; a third worm gear 30; a third worm wheel 32; and a connecting rotating body 33. The encoder 140 further includes a drive gear 34; a driven gear 36; a third rotating body 38; a magnet Mr; and an angular sensor Sr. Other configurations are the same as those described above. In other words, the encoder 160 has a combination of configurations of the absolute encoder 100 according to the first embodiment; the encoder 120 according to the second embodiment; and the encoder 140 according to the third embodiment. Duplicate explanations will be omitted for configurations that have been described in the first to third embodiments, and the configuration that differs will be described.

The controller 40 determines a rotation amount of the main spindle 1a based on respective rotation angles acquired from angular sensors Sp, Sq, and Sr.

In such a configuration, the encoder 160 according to the fourth embodiment determines a rotation amount of the main spindle 1a that rotates a plurality of revolutions, in accordance with rotation angles detected by the angular sensor Sr. Thereby, a determinable range of rotation amounts of the main spindle 1a can be further increased. The encoder 160 determines a rotation amount of the main spindle 1a that rotates a plurality of revolutions, in accordance with rotation angles detected by the angular sensor Sp. Thereby, reductions in resolution of determinable rotation amounts of the main spindle 1a can be suppressed, compared to a case where the angular sensor Sp is not included. The encoder 160 identifies a rotation angle at which the main spindle 1a is rotated, in accordance with a rotation angle detected by the angular sensor Sq. Thereby, resolution of determinable rotation angles at which the main spindle 1a is rotated, can be improved.

As a result, the encoder 160 can further increase a determinable range of rotation amounts of the main spindle, as well as enabling to improve resolution of determinable rotation angles at which the main spindle is rotated.

Hereafter, a detailed configuration of the encoder 160 according to the fourth embodiment will be described with reference to FIGS. 5 to 12. Note that, with respect to the absolute encoders 100, 120, and 140 according to the first to third embodiments, the following explanation will be provided for the configuration that is common to the encoder 160.

Figure 5:
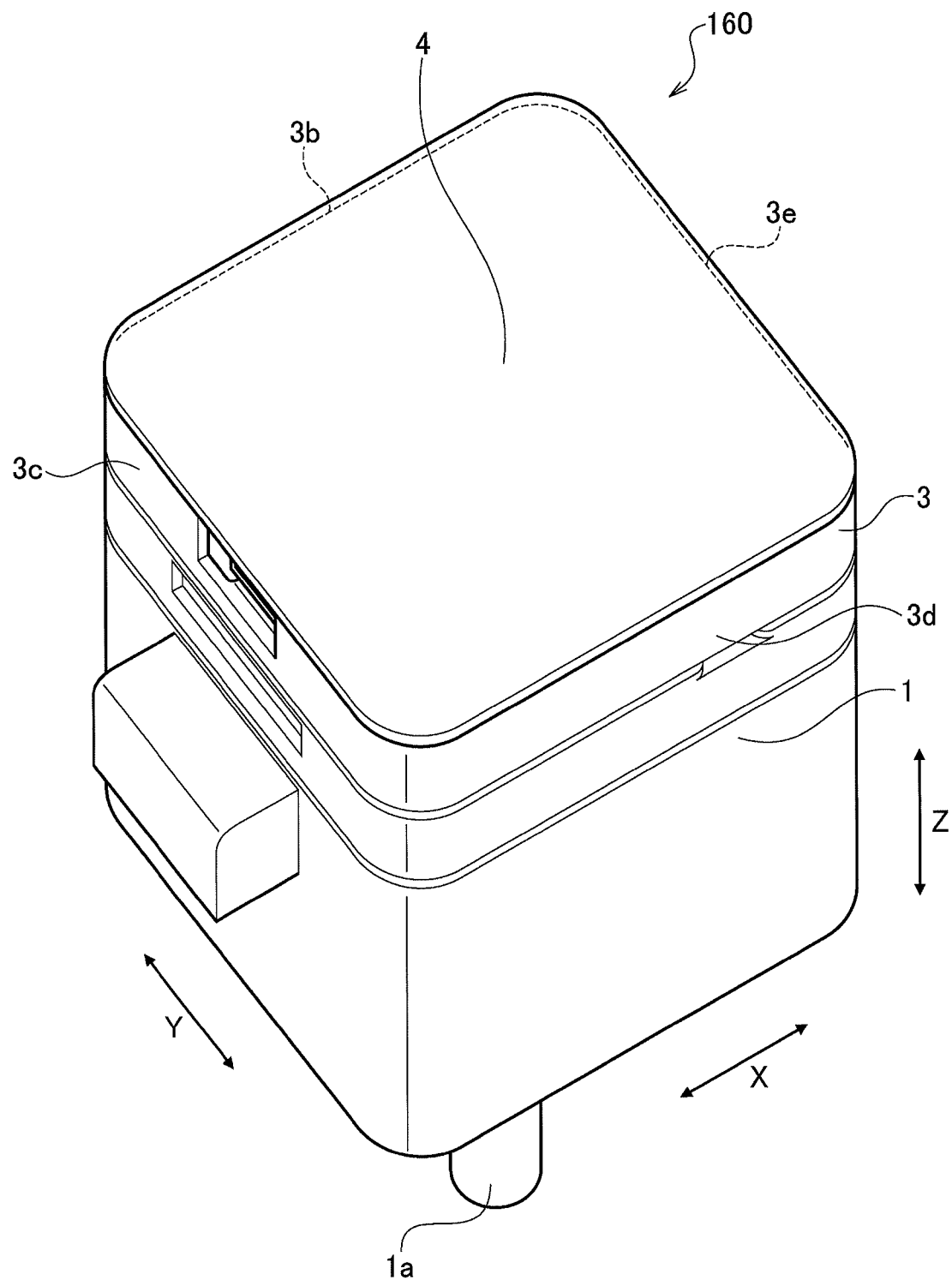
FIG. 5 is a perspective view of the encoder in FIG. 4.

FIG. 5 is a perspective view of the encoder 160 according to the fourth embodiment. In the following, explanation will be provided using an XYZ orthogonal coordinate system. An X-axis direction corresponds to a horizontal right-and-left direction, a Y-axis direction corresponds to a horizontal back-and-forth direction, and a Z-axis direction corresponds to a vertical upward-and-downward direction. The Y-axis direction and Z-axis direction are each orthogonal to the X-axis direction. The X-axis direction may be referred to as a left direction or a right direction. The Y-axis direction may be referred to as a forth direction or a back direction. The Z-axis direction may be referred to as an upward direction or a downward direction. In this figure, a sight viewed from above in the Z-axis direction is referred to as a plan view, a sight viewed from the front in a Y-axis direction is referred to as a front view, and a sight viewed from side to side in an X-axis direction is referred to as a side view. Indications of such directions do not limit an orientation of using the encoder 160, and the encoder 160 may be used in any orientation.

As described above, the encoder 160 is an absolute type encoder that determines a rotation amount corresponding to a plurality of revolutions of the main spindle of the motor 1, to output it. In this example, the encoder 160 is disposed at an end portion of the motor 1 toward the Z-axis direction. A shape of the encoder 160 is not particularly restricted. In the embodiment, the encoder 160 has an approximately rectangular shape in a plan view, and, in each of a front view and a side view, has a laterally-long rectangular shape that is thin in a direction of extension of a main spindle (hereinafter referred to as an axial direction; and in this example, the axial direction is a direction parallel to the Z-axis direction). In other words, the encoder 160 has a flat, rectangular shape in the Z-axis direction.

The encoder 160 includes a hollow, square tubular housing 3 that houses an internal structure. The housing 3 includes a plurality (e.g., four) of outer wall sections 3b, 3c, 3d, and 3e that surround at least a main spindle and an intermediate rotating body. A lid section 4 is fixed to end portions of the respective outer wall sections 3b, 3c, 3d, and 3e of the housing 3. The lid section 4 has an approximately rectangular shape in a flat view, and is a plate-like member that is axially thin. The outer wall sections 3b, 3c, 3d, and 3e are coupled in this order. The outer wall sections 3b and 3d are disposed to be parallel to each other. The outer wall sections 3c and 3e are each coupled between side portions of the outer wall sections 3b and 3d, and are disposed to be parallel to each other. In this example, the outer wall sections 3b and 3d each extend in the X-axis direction and in a plan view, and the outer wall sections 3c and 3e each extend in the Y-axis direction and in a plan view.

As an example, the motor 1 may include a stepping motor or a DC brushless motor. As an example, the motor 1 may be used as a drive source for driving an industrial robot or the like, via a reduction mechanism such as a strain wave gearing. The main spindle 1a of the motor 1 protrudes from both sides of the motor 1 toward the Z-axis direction. The encoder 160 outputs a rotation amount of the main spindle 1a, as a digital signal.

Figure 6:
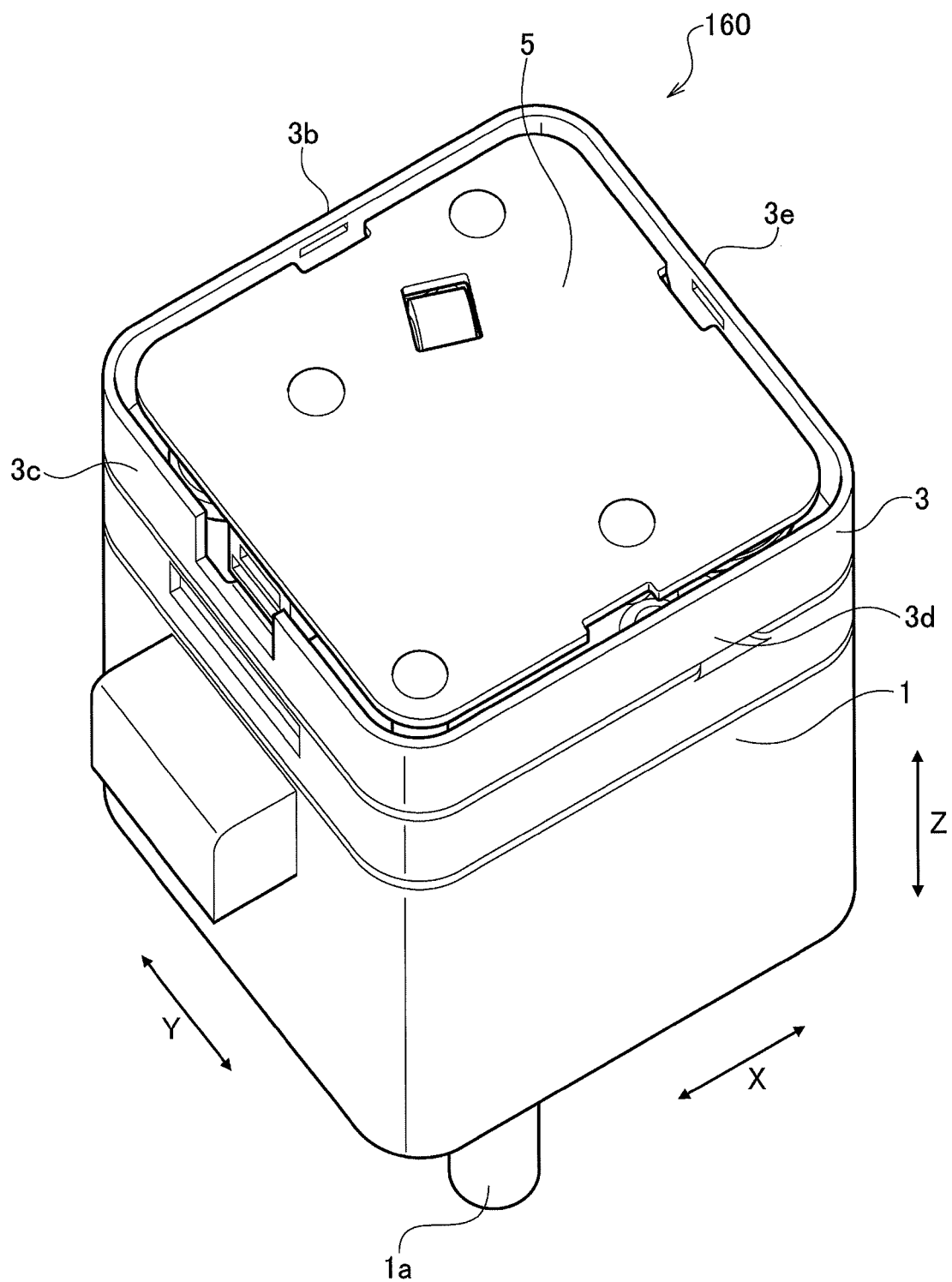
FIG. 6 is another perspective view of the encoder in FIG. 4.
Figure 7:
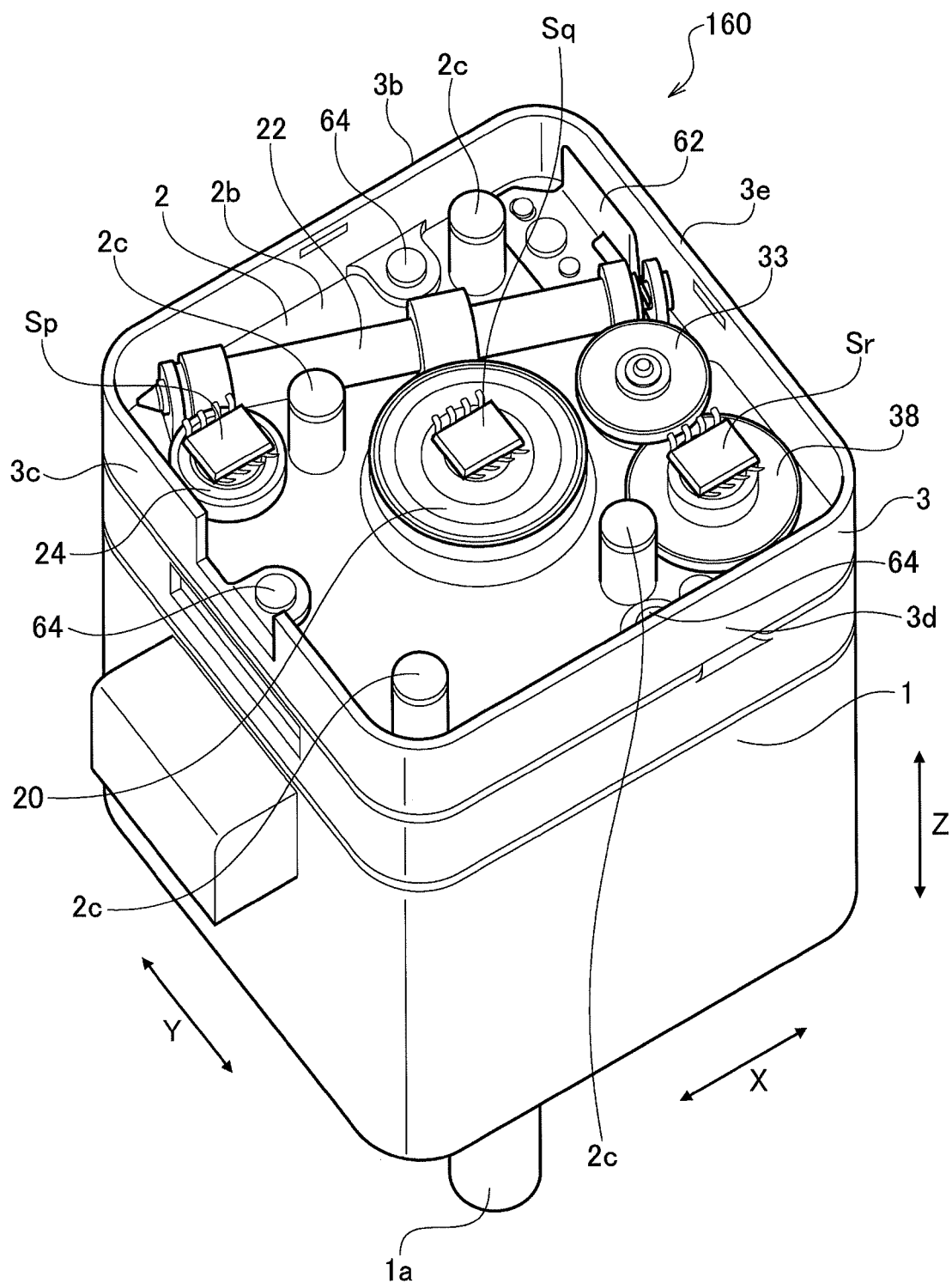
FIG. 7 is yet another perspective view of the encoder in FIG. 4.
Figure 8:
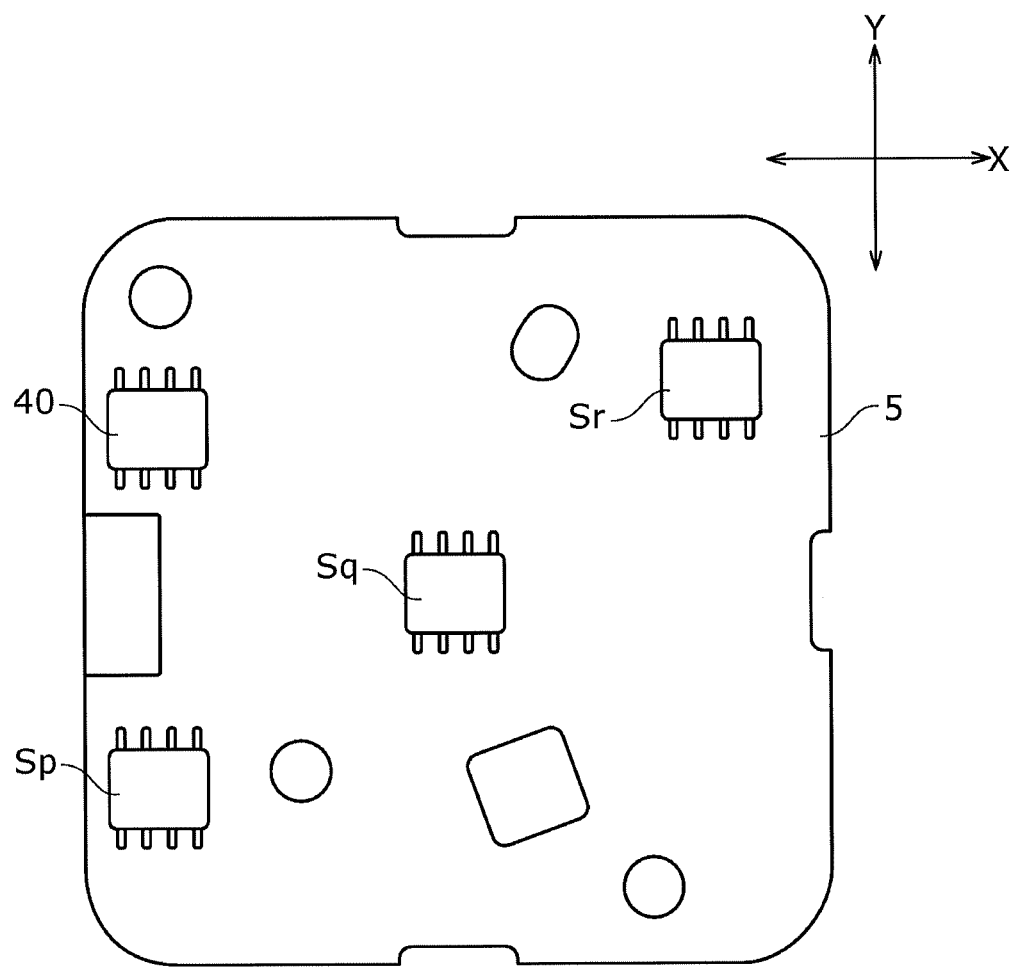
FIG. 8 is a bottom view of a substrate of the encoder in FIG. 4.
Figure 9:
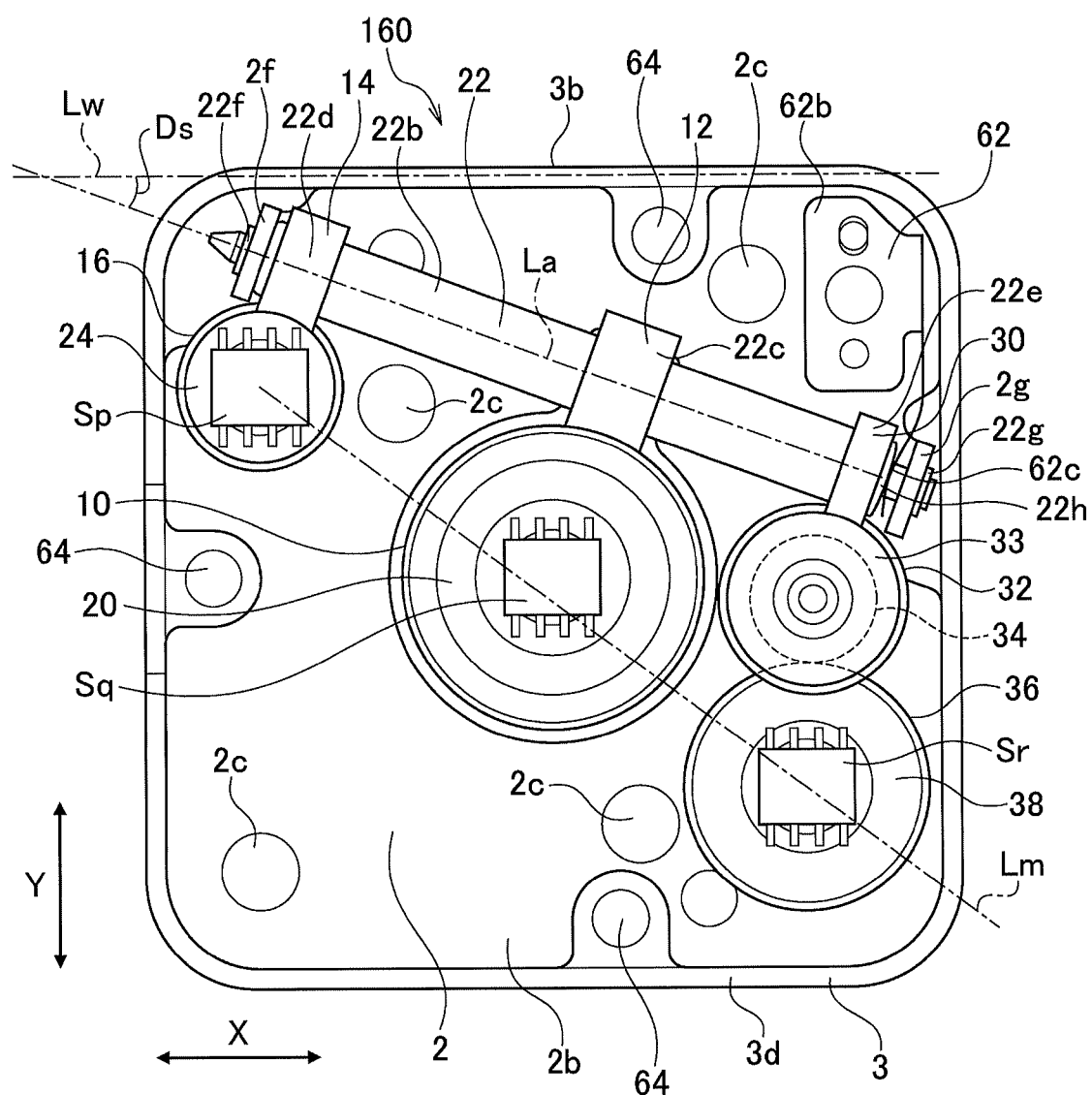
FIG. 9 is a plan view of the encoder in FIG. 4.
Figure 10:
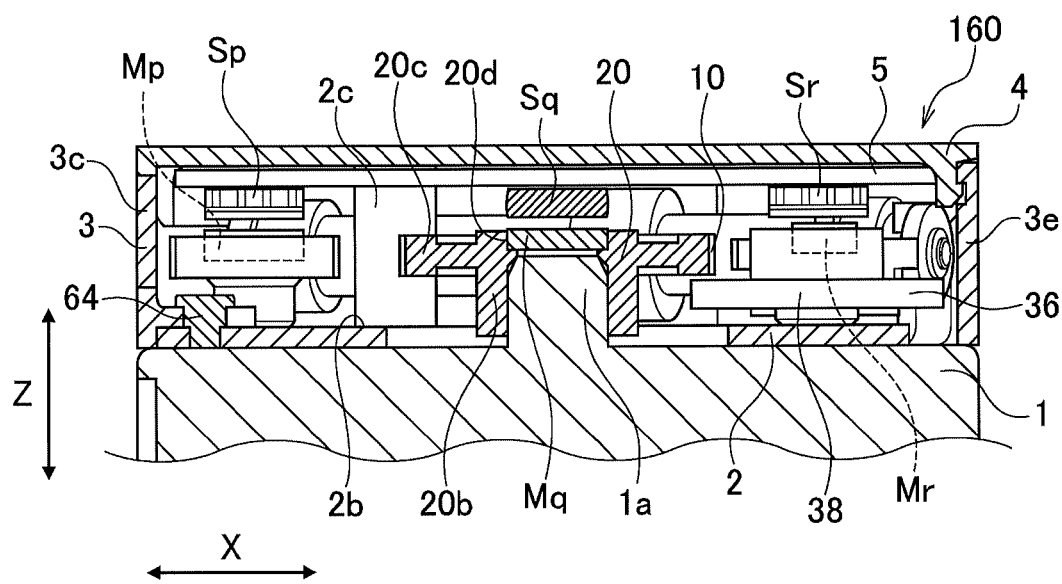
FIG. 10 is a front view with a cross-section of a portion of the encoder in FIG. 4.
Figure 11:
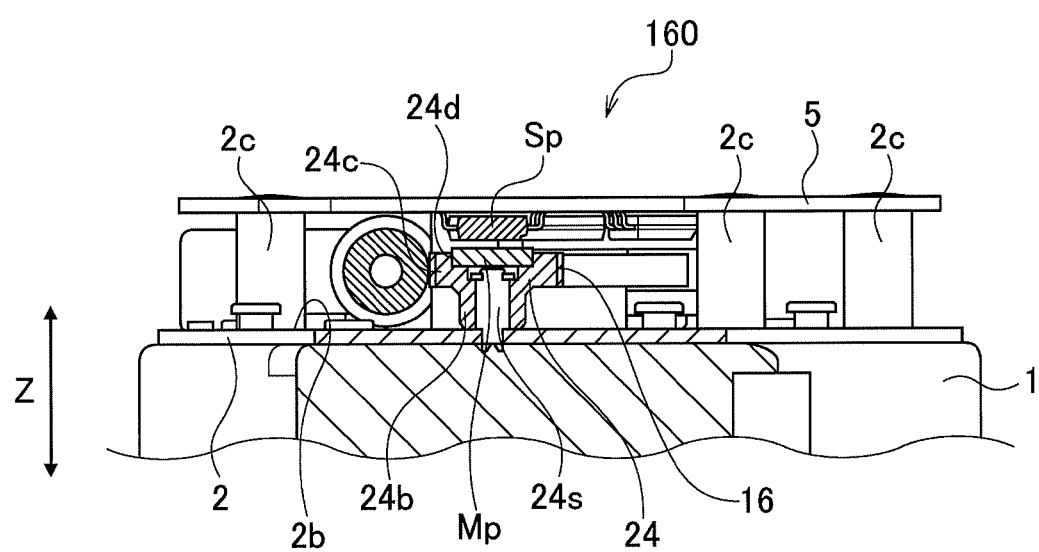
FIG. 11 is a cross-sectional view of the surroundings of a second rotating body of the encoder in FIG. 4.
Figure 12:
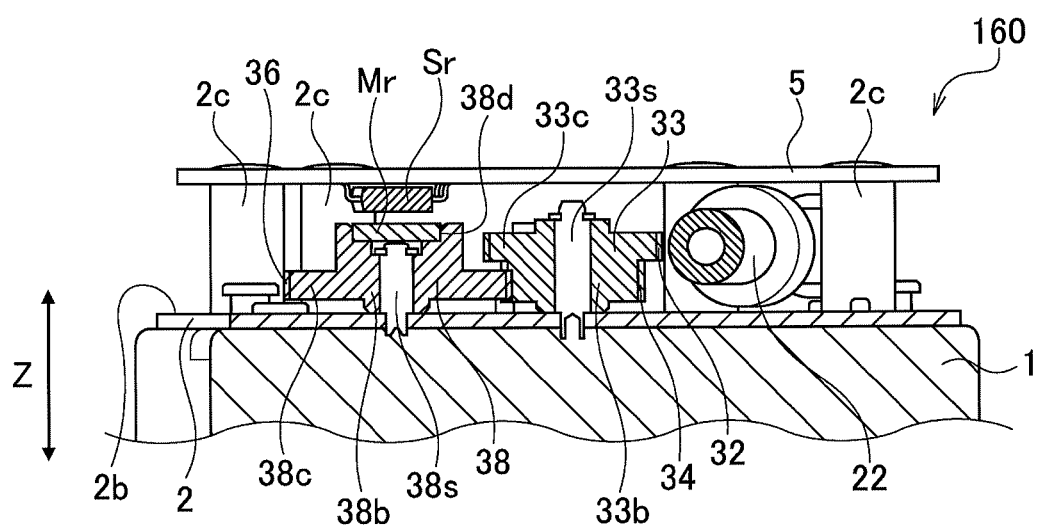
FIG. 12 is a cross-sectional view of the surroundings of a third rotating body and a connecting rotating body of the encoder in FIG. 4.

FIG. 6 is another perspective view of the encoder 160. In FIG. 6, a state in which the lid section 4 is removed from the housing 3 is indicated. In this state, a substrate 5 is disposed to cover the inside of the encoder. The substrate 5 has an approximately rectangular shape in a plan view, and is a printed wiring board that is plate-like and that is axially thin. FIG. 7 is yet another perspective view of the encoder 160. FIG. 8 is a bottom view of the substrate 5. FIG. 9 is a plan view of the encoder 160. In each of FIGS. 7 and 9, a state in which the substrate 5 is removed is illustrated. Although the angular sensors Sp, Sq, and Sr are mounted on the substrate 5, the angular sensors Sp, Sq, and Sr are illustrated in each figure, for ease of understanding. FIG. 10 is a front view of the encoder 160. In FIG. 10, a state in which the encoder 160 is cut along a plane that is parallel to the Z-axis direction and that passes through the center of the main spindle 1a is illustrated. FIG. 11 is a cross-sectional view of the surroundings of a second rotating body 24. FIG. 11 illustrates a longitudinal cross-section in which the encoder 160 is viewed substantially from a left side. In FIG. 11, a state in which the encoder 160 is cut along a plane that passes through the center of a second rotating body 24; and that is perpendicular to an axial line of an intermediate rotating body 22 and is parallel to the Z-axis direction, is illustrated. FIG. 12 is a cross-sectional view of the surroundings of the third rotating body 38 and a connecting rotating body 33. FIG. 12 illustrates a longitudinal cross-section in which the encoder 160 is viewed substantially from a right side. In FIG. 12, a state in which the encoder 160 is cut along a plane that passes through the center of a third rotating body 38 and the center of the connecting rotating body 33; and that is parallel to the Z-axis direction is illustrated. In each of FIGS. 11 and 12, the housing 3 and the lid section 4 are not illustrated.

The encoder 160 includes a base 2, a housing 3, a lid section 4, a substrate 5, a preloading section 62, and a plurality of fasteners 64. The base 2 is a base that rotatably supports each rotating body and each gear. A support pillar 2c that is disposed in the base 2 supports the substrate 5. The substrate 5 mainly supports the angular sensors Sp, Sq, and Sr, and a controller 40. The base 2 includes a bottom section 2b and a plurality (e.g., four) of support pillars 2c. The bottom section 2b is a plate-like portion that contacts the motor 1 used in the encoder 160, and extends in the X-axis direction and the Y-axis direction. Each support pillar 2c is an approximately cylindrical portion that protrudes, in an axial direction, from the bottom section 2b to be away from the motor 1. The hollow, square, tubular housing 3 is fixed to the bottom section 2b of the base 2, by a plurality (e.g., three) fasteners 64. Each fastener 64 may be a screw, for example. The substrate 5 is fixed to a protrusion end of each support pillar 2c, by using a given screw (not shown), for example. The preloading section 62 will be described below.

Further, the encoder 160 includes a first rotating body 20; a first worm gear 10; a first worm wheel 12; an intermediate rotating body 22; a second worm gear 14; a second worm wheel 16; and a second rotating body 24. The encoder 160 includes a third worm gear 30; a third worm wheel 32; a connecting rotating body 33; a drive gear 34; a driven gear 36; and a third rotating body 38. The encoder 160 includes magnets Mp, Mq, and Mr; angular sensors Sp, Sq, and Sr; and a controller 40 (see FIG. 8).

(First Rotating Body)

The first rotating body 20 rotates in accordance with rotation of the main spindle 1a, and transfers a rotation of the main spindle 1a to the first worm gear 10. The first rotating body 20 includes a coupling section 20b that engages with an outer periphery of the main spindle 1a; a gear forming section 20c in which the first worm gear 10 is formed; and a retainer section 20d for retaining the magnet Mq. The coupling section 20b has a cylindrical shape that surrounds the main spindle 1a. The gear forming section 20c has a disc shape that radially extends from an outer periphery of the coupling section 20b. The retainer section 20d has a cylindrical, recessed shape that is provided in an axial direction of the gear forming section 20c and at an end portion farther away from the bottom section 2b. The coupling section 20b, the gear forming section 20c, and the retainer section 20d are integrally formed such that respective center axes coincide. The first rotating body 20 can be formed of various materials, such as a resin material and a metallic material. In this example, the first rotating body 20 is formed of a polyacetal resin.

(First Worm Gear)

The first worm gear 10 is a transmission element that drives the first worm wheel 12. In particular, the first worm gear 10 is a screw gear that is formed on an outer periphery of the gear forming section 20c and of which the number of threads is 1. An axial line of rotation of the first worm gear 10 extends in an axial direction of the main spindle 1a.

(Intermediate Rotating Body)

The intermediate rotating body 22 rotates in accordance with rotation of the main spindle 1a, and transfers a rotation of the main spindle 1a to the second rotating body 24 and the connecting rotating body 33. The intermediate rotating body 22 is rotatably supported about an axial line La of rotation that extends to be approximately parallel to the bottom section 2b. The intermediate rotating body 22 is an approximately cylindrical member that extends in a direction of the axial line La of rotation. The intermediate rotating body 22 includes a base section 22b; a first cylindrical section 22c in which a first worm wheel 12 is formed; and a second cylindrical section 22d in which a second worm gear 14 is formed. The intermediate rotating body 22 includes a third cylindrical section 22e in which a third worm gear 30 is formed; and supported sections 22f and 22g that are disposed at both ends.

The outer wall section 3b is disposed on the side opposite the main spindle 1a with respect to the intermediate rotating body 22. The outer wall section 3d is parallel to the outer wall section 3b and is disposed on a side where the main spindle 1a is disposed, with respect to the intermediate rotating body 22. The intermediate rotating body 22 may be disposed such that the axial line La of rotation of the intermediate rotating body is toward any direction. The axial line La of rotation of the intermediate rotating body 22 may be set to be inclined, in a plan view, at an angle in a range of from 5° to 30°, with respect to a direction of extension of the outer wall section 3b that is disposed on the side opposite the main spindle 1a with respect to the intermediate rotating body 22. In an example of FIG. 9, in a plan view, the axial line La of rotation of the intermediate rotating body 22 is inclined at an angle of 20° with respect to a direction of extension of the outer wall section 3b. In other words, the housing 3 includes the outer wall section 3b that, in a plan view, extends in a direction inclined at an angle in a range of from 5° to 30°, with respect to the axial line La of rotation of the intermediate rotating body 22. In the example of FIG. 9, inclination Ds of the axial line La of rotation of the intermediate rotating body 22, with respect to a direction of extension of the outer wall section 3b, is set to 20°.

In this example, the base section 22b has a cylindrical shape, and the first cylindrical section 22c, the second cylindrical section 22d, and the third cylindrical section 22e each have a cylindrical shape whose outer diameter is larger than the base section 22b. The base section 22b, the first cylindrical section 22c, the second cylindrical section 22d, the third cylindrical section 22e, and the supported sections 22f and 22g are integrally formed such that respective center axes coincide. The second cylindrical section 22d, the first cylindrical section 22c, and the third cylindrical section 22e are disposed in this order to be away from each other. The intermediate rotating body 22 may be formed of various materials, such as a resin material and a metallic material. In this example, the intermediate rotating body 22 is formed of a polyacetal resin.

In this example, the supported sections 22f and 22g are supported by support sections 2f and 2g each of which is formed by cutting a part of the bottom section 2b. The respective support sections 2f and 2g have openings that are provided through the intermediate rotating body 22, in an axial line of rotation and in which the supported sections 22f and 22g are engaged. In such a manner, the intermediate rotating body 22 is rotatably supported by the support sections 2f and 2g.

(Preloading Section)

A preloading section 62 will be described. When the second worm gear 14 and the third worm gear 30 drive respective worm wheels, a reaction force is applied in a direction of an axial line of rotation of the intermediate rotating body 22, and thus a position of the intermediate rotating body 22 may change. In view of the issue, in this example, the preloading section 62 is provided to apply a biasing force to the intermediate rotating body 22. The preloading section 62 applies a biasing force toward an opposite direction of a reaction force, to the intermediate rotating body 22, and thus changes in a given position in a direction of an axial line of rotation are suppressed. The preloading section 62 includes a mounting section 62b mounted on the bottom section 2b; and a spring section 62c that extends from the mounting section 62b and that contacts a hemispherical protrusion 22h. Each of the mounting section 62b and the spring section 62c is thin plate-like and is formed of a spring material. A base of the spring section 62c is bent at an approximately right angle with respect to the mounting section 62b. As described above, with the preloading section 62 biasing the hemispherical protrusion 22h, influence on rotational movement of the intermediate rotating body 22 is reduced, as well as enabling to suppress changes in a given position in a axial direction of rotation of the intermediate rotating body 22.

In this example, a direction of a reaction force applied to the intermediate rotating body 22 due to rotation of the second worm gear 14, is set to be opposite to a direction of a reaction force applied to the intermediate rotating body 22 due to rotation of the third worm gear. In particular, a gear tooth shape of each worm gear is set so that, in an axial direction of rotation of the intermediate rotating body 22, components of reaction forces are opposite to each other. Specifically, inclined directions of teeth of respective worm gears are set so that, in an axial direction of rotation of the intermediate rotating body 22, components of reaction forces through the worm gears are oriented in an opposite direction with respect to each other. In this case, because a resultant reaction force is decreased compared to a case where reaction forces through respective worm gears are applied in a same direction, a biasing force through the preloading section 62 can be reduced accordingly. In this case, rotation resistance of the intermediate rotating body 22 is reduced and thus rotation can be smoothly performed.

(First Worm Wheel)

The first worm wheel 12 is a transmission element that is driven by the first worm gear 10. In particular, the first worm wheel 12 is a helical gear that is formed on an outer periphery of the first cylindrical section 22c and of which the number of teeth is 20. The first worm gear 10 and the first worm wheel 12 constitute a first worm speed-changing mechanism 11. An axial line of rotation of the first worm wheel 12 extends in a direction perpendicular to an axial direction of the main spindle 1a.

(Second Worm Gear)

The second worm gear 14 is a transmission element that drives the second worm wheel 16. In particular, the second worm gear 14 is a screw gear that is formed on an outer periphery of the second cylindrical section 22d and of which the number of threads is 5. An axial line of rotation of the second worm gear 14 extends in a direction perpendicular to an axial direction of the main spindle 1a.

(Second Rotating Body)

The second rotating body 24 rotates in accordance with rotation of the main spindle 1a, and transfers the rotation of the main spindle 1a to the magnet Mp at a reduced speed. The second rotating body 24 is rotatably supported about an axial line of rotation, which extends approximately vertically from the bottom section 2b. The second rotating body 24 is an approximately circular member in a plan view. A bearing section 24b rotatably supported by the bottom section 2b; an extended section 24c in which the second worm wheel 16 is formed; and a retainer section 24d for retaining a magnet Mp, are included. The bearing section 24b has a cylindrical shape that surrounds a shaft 24s protruding from the bottom section 2b, through a gap.

The extended section 24c has a disc shape that extends radially from an outer periphery of the bearing section 24b. In this example, the extended section 24c is disposed at a location toward a farther end portion of the bearing section 24b away from the bottom section 2b. The retainer section 24d has a cylindrical, recessed shape that is disposed in an axial direction of the extended section 24c and at a farther end portion away from the bottom section 2b. The bearing section 24b, the extended section 24c, and the retainer section 24d are integrally formed such that respective center axes coincide. The second rotating body 24 may be formed of various materials, such as a resin material and a metallic material. In this example, the second rotating body 24 is formed of a polyacetal resin.

(Second Worm Wheel)

The second worm wheel 16 is a helical gear that is driven by the second worm gear 14. In particular, the second worm wheel 16 is a helical gear that is formed on an outer periphery of the extended section 24c and of which the number of teeth is 25. The second worm gear 14 and second worm wheel 16 configures a second worm speed-changing mechanism 15. An axial line of rotation of the second worm wheel 16 extends in a direction parallel to an axial direction of the main spindle 1a.

The third worm gear 30 is a transmission element that drives the third worm wheel 32. In particular, the third worm gear 30 is a screw gear that is formed on an outer periphery of the third cylindrical section 22e and of which the number of threads is 1. An axial line of rotation of the third worm gear 30 extends in a direction perpendicular to an axial direction of the main spindle 1a.

(Connecting Rotating Body)

The connecting rotating body 33 rotates in accordance with rotation of the main spindle 1a, and transfers the rotation of the main spindle 1a to the third rotating body 38 at a reduced speed. The connecting rotating body 33 is rotatably supported about an axial line of rotation, which extends approximately vertically from the bottom section 2b. The connecting rotating body 33 is an approximately circular member in a plan view. A bearing section 33b rotatably supported by the bottom section 2b; and an extended section 33c in which a third worm wheel 32 is formed, are included. The bearing section 33b has a cylindrical shape that surrounds a shaft 33s protruding from the bottom section 2b, through a gap.

With the connecting rotating body 33 being included, the third rotating body 38 as described below, can be accordingly disposed at a location away from the third worm gear 30. Thereby, a distance between the magnets Mq and Mr can be increased and thus an influence of leaked magnetic flux with respect to each other can be decreased. Further, with the connecting rotating body 33 being included, a range of reduction ratios is increased, and thus design flexibility is improved.

The extended section 33c has a disc shape that radially extends from an outer periphery of the bearing section 33b. In this example, the extended section 33c is disposed at a location toward a farther end portion of the bearing section 33b away from the bottom section 2b. A drive gear 34 is formed on an outer periphery of the bearing section 33b in a closer area to the bottom section 2b than the extended section 33c. The bearing section 33b and the extended section 33c are integrally formed such that respective center axes coincide. The connecting rotating body 33 may be formed of various materials, such as a resin material and a metallic material. In this example, the connecting rotating body 33 is formed of a polyacetal resin.

(Third Worm Wheel)

The third worm wheel 32 is a transmission element that is driven by the third worm gear 30. In particular, the third worm wheel 32 is a helical gear that is formed on an outer periphery of the extended section 33c and of which the number of teeth is 30. The third worm gear 30 and the third worm wheel 32 constitute a third worm speed-changing mechanism 31. An axial direction of rotation of the third worm wheel 32 extends in a direction parallel to an axial direction of the main spindle 1a.

(Drive Gear)

The drive gear 34 is a transmission element that drives the driven gear 36. In particular, the drive gear 34 is a spur gear that is formed on an outer periphery of the bearing section 33b and of which the number of teeth is 24.

(Third Rotating Body)

The third rotating body 38 rotates in accordance with rotation of the main spindle 1a, and transfers the rotation of the main spindle 1a to the magnet Mr at a reduced speed. The third rotating body 38 is rotatably supported about an axial line of rotation, which extends approximately vertically from the bottom section 2b. The third rotating body 38 is an approximately circular member in a plan view. The third rotating body 38 includes a bearing section 38b rotatably supported by the bottom section 2b; an extended section 38c in which the driven gear 36 is formed; and a retainer section 38d for retaining the magnet Mr. The bearing section 38b has a cylindrical shape that surrounds a shaft 38s protruding from the bottom section 2b, through a gap.

The extended section 38c has a disc shape that radially extends from an outer periphery of the bearing section 38b. In this example, the extended section 38c is disposed at a location of the bearing section 38b toward the bottom section 2b. The retainer section 38d has a cylindrical, recessed shape that is disposed in an axial direction of the bearing section 38b and at a farther end portion away from the bottom section 2b. The bearing section 38b, the extended section 38c, and the retainer section 38d are integrally formed such that respective center axes coincide. The third rotating body 38 may be formed of various materials, such as a resin material and a metallic material. In this example, the third rotating body 38 is formed of a polyacetal resin.

(Driven Gear)

The driven gear 36 is a transmission element that is driven by the drive gear 34. In particular, the driven gear 36 is a spur gear that is formed on an outer periphery of the extended section 38c and of which the number of teeth is 60. The drive gear 34 and the driven gear 36 configures a reduction mechanism 35.

(Magnet)

The magnets Mp, Mq, and Mr (hereinafter referred to as each magnet) each have an approximately cylindrical shape that is axially flat. Each magnet may be formed of a ferrite-based or NdFeB-based magnetic material, for example. Each magnet may include a rubber magnet or a bond magnet that includes a resin binder, for example. Each magnet has magnetic poles. A direction of magnetization of each magnet is not restricted. In this example, two magnetic poles Up, Uq, and Ur are disposed on end surfaces of respective magnets each of which faces a given angular sensor. Distribution of magnetic flux density in a rotational direction of each magnet may be indicated to be trapezoidal, sinusoidal, or rectangular. In the embodiment, magnetization is achieved so as to allow for a trapezoidal pattern.

Each magnet is partially or wholly housed in a recess formed in a given end portion of each rotating body, and is fixed with adhesion or a swage, for example. Adhesively, the magnet Mp is fixed to the retainer section 24d of the second rotating body 24, the magnet Mq is fixed to the retainer section 20d of the first rotating body 20, and the magnet Mr is fixed to the retainer section 38d of the third rotating body 38.

When a distance between magnets is decreased, errors in detection through a given angular sensor are increased due to an effect of leakage flux of adjacent magnets. For this reason, in the example of FIG. 9, in a plan view, magnets are spaced apart from each other, on a line (hereinafter, referred to as an arrangement line Lm) that is inclined with respect to the outer wall section 3b of the housing 3. A distance between magnets can be increased, compared to a case where the arrangement line Lm is parallel to the outer wall section 3b. From this viewpoint, in the present embodiment, inclination of the arrangement line Lm with respect to the outer wall section 3b is preferably in a range of from 30° to 60°, and is set to be in a range of from 38° to 42° in the example of FIG. 9.

(Angular Sensor)

The angular sensors Sp, Sq, and Sr (hereinafter, referred to as each angular sensor) are sensors each of which detects an absolute rotation angle in a range of from 0° to 360°, which corresponds to a single revolution of a given rotating body. Each angular sensor outputs a signal (e.g., a digital signal) corresponding to a detected rotation angle, to the controller 40. Each angular sensor outputs the same rotation angle as before a power supply interruption, even when power is interrupted and then is supplied again. In such a manner, a configuration that does not include a backup power supply is achieved.

As illustrated in FIG. 8, each angular sensor is fixed to a surface toward the bottom section 2b of the substrate 5, by a method such as soldering or adhesion. The angular sensor Sp is fixed to the substrate 5 at a location facing, via a gap, the magnetic poles Up of the magnet Mp that is disposed on the second rotating body 24. The angular sensor Sq is fixed to the substrate 5 at a location facing, via a gap, the magnetic poles Uq of the magnet Mq that is disposed on the first rotating body 20. The angular sensor Sr is fixed to the substrate 5 at a location facing, via a gap, the magnetic poles Ur of the magnet Mr that is disposed on the third rotating body 38.

A magnetic angular sensor with relatively high resolution may be used as each angular sensor. A given magnetic angular sensor is disposed in an axial direction of each rotating body to face the magnetic poles of each magnet, through a gap. The given magnetic angular sensor identifies a rotation angle at which a rotor is rotated, based on rotation of the magnetic poles, to output a digital signal. As an example, the magnetic angular sensor includes a detecting element that detects magnetic poles; and an arithmetic circuit that outputs a digital signal based on output of the detecting element. The detecting element may include a plurality (e.g., four) of magnetic field-detecting elements, such as Hall elements or GMR (Giant Magneto Resistive) elements.

The arithmetic circuit may identify a rotation angle by table processing in which a look-up table is used with an output difference or ratio as a key through multiple detecting elements, for example. The detecting elements and the arithmetic circuit may be integrated as one IC chip. Such an IC chip may be embedded in resin that has a thin, cuboid contour. Each angular sensor outputs, to the controller 40, an angle signal that is a digital signal corresponding to a rotation angle at which a given rotor is rotated and that is detected via a wiring member that is not shown. For example, each angular sensor outputs a rotation angle at which a given rotating body is rotated, as a digital signal of multiple bits (e.g., 7 bits).

(Controller)

The controller 40 will be described. From a viewpoint of hardware, each block of the controller 40 as illustrated in FIG. 4 can be implemented by an element such as a central processing unit (CPU) of a computer; or mechanical equipment, or be implemented by a computer program or the like, from a viewpoint of software. In this description, functional blocks that are implemented by their interoperation are illustrated. It would be understood by those skilled in the art who has read the specification that these functional blocks can be implemented in various manners of combining hardware and software.

The controller 40 includes rotation-angle acquiring sections 40p, 40q, and 40r; a relation table 40b; a rotation-amount determining section 40c; and an output section 40e. The rotation-angle acquiring section 40p acquires a rotation angle Ap at which the second rotating body 24 is rotated and that is detected by the angular sensor Sp. The rotation-angle acquiring section 40q acquires a rotation angle Aq at which the first rotating body 20 is rotated and that is detected by the angular sensor Sq. The rotation-angle acquiring section 40r acquires a rotation angle Ar at which the third rotating body 38 is rotated and that is detected by the angular sensor Sr. The relation table 40b performs table processing in which a rotation speed at which the main spindle 1a rotates and that corresponds to acquired rotation angles Ap and Ar is identified. The rotation-amount determining section 40c determines a rotation amount of the main spindle 1a through multiple revolutions, in accordance with a rotation speed at which the main spindle 1a rotates and that is identified by the relation table 40b; and an acquired rotation angle Aq. The output section 40e converts a determined rotation amount of the main spindle 1a through the multiple revolutions, into a desired type signal to output it. In this example, as illustrated in FIG. 8, the controller 40 is fixed to a surface of the substrate 5 toward the bottom section 2b, by a method such as soldering or adhesive.

In such a manner, a function and effect of the encoder 160 according to the fourth embodiment will be described.

An encoder 160 according to the fourth embodiment is an absolute encoder that determines a rotation amount of a main spindle 1a that rotates a plurality of revolutions. The encoder 160 includes a first worm gear 10 that rotates in accordance with rotation of the main spindle 1a; a first worm wheel 12 that engages with the first worm gear 10; a second worm gear 14 that rotates in accordance with rotation of the first worm wheel 12; a second worm wheel 16 that engages with the second worm gear 14; and an angular sensor Sp that detects a rotation angle at which a second rotating body 24 is rotated in accordance with rotation of the second worm wheel 16. In such a configuration, a rotation amount of the main spindle 1a that rotates a plurality of revolutions can be determined in accordance with a detected result by the angular sensor Sp. A first worm speed-changing mechanism 11 including the first worm gear 10 and the first worm wheel 12; and a second worm speed-changing mechanism 15 including the second worm gear 14 and the engaging second worm gear 14, are included, and thus the encoder 160 forms a bent transmission path whereby thinning is possible. Such a function and effect may also be achieved by the absolute encoders 100, 120, and 140 according to the first to third embodiments each of which has a similar configuration.

An encoder 160 according to the fourth embodiment is an absolute encoder that determines a rotation amount of a main spindle 1a that rotates a plurality of revolutions. The encoder 160 includes an intermediate rotating body 22 that rotates at a first reduction ratio in accordance with rotation of the main spindle 1a; a second rotating body 24 that rotates at a second reduction ratio in accordance with rotation of the intermediate rotating body 22; and an angular sensor Sp that detects a rotation angle at which the second rotating body 24 is rotated. Where, an axial line of rotation of the main spindle 1a is skew with respect to an axial line of rotation of the intermediate rotating body 22 and is set to be parallel to an axial line of rotation of the second rotating body 24. In such a configuration, the rotation amount of the main spindle 1a that rotates a plurality of revolutions can be determined in accordance with a detected result by the angular sensor Sp. An axial line of rotation of the intermediate rotating body 22 is skew with respect to axial lines of rotation of the main spindle 1a and the second rotating body 24, and orthogonally intersects the respective axial lines in a front view. Thereby, the encoder 160 can form a bent transmission path whereby thinning is possible. Such a function and effect may also be achieved by the absolute encoders 100, 120, and 140 according to the first to third embodiments each of which has a similar configuration.

An encoder 160 according to the fourth embodiment is an absolute encoder that determines a rotation amount of a main spindle 1a that rotates a plurality of revolutions. The encoder 160 includes a reduction mechanism including a first worm speed-changing mechanism 11, the reduction mechanism being configured to rotate a magnet Mp in accordance with rotation of the main spindle 1a; and an angular sensor Sp configured to detect a rotation angle at which the magnet Mp is rotated, through magnetic poles Up of the magnet Mp. Where, an axial line of rotation of the main spindle 1a is set to be parallel to an axial line of rotation of the magnet Mp. In such a configuration, a rotation amount of the main spindle 1a that rotates a plurality of revolutions can be determined in accordance with a detected result by the angular sensor Sp. The first worm speed-changing mechanism 11 is included, and an axial line of rotation of the main spindle 1a and an axial line of rotation of the magnet Mp are set to be parallel to each other. Thereby, the encoder 160 can form a bent transmission path whereby thinning is possible. Such a function and effect may also be achieved by the absolute encoders 100, 120, and 140 according to the first to third embodiments each of which has a similar configuration.

The encoder 160 according to the fourth embodiment includes an angular sensor Sq configured to detect a rotation angle at which the main spindle 1a is rotated. In such a configuration, a rotation angle at which the main spindle 1a is rotated can be identified in accordance with a detected result by the angular sensor Sq. Compared to a case where the angular sensor Sq is not included, the encoder 160 can improve resolution of identifiable rotation angles at which the main spindle 1a is rotated. Such a function and effect may also be achieved by the encoder 120 according to the second embodiment that has a similar configuration.

The encoder 160 according to the fourth embodiment includes a third worm gear 30 that rotates in accordance with rotation of the first worm wheel 12; a third worm wheel 32 that engages with the third worm gear 30; and an angular sensor Sr that detects a rotation angle at which a third rotating body 38 is rotated in accordance with rotation of the third worm wheel 32. In such a configuration, a rotation amount of the main spindle 1a that rotates a plurality of revolutions can be determined in accordance with a detected result by the angular sensor Sq. Compared to a case where the angular sensor Sr is not included, the encoder 160 can increase a determinable range of rotation amounts of the main spindle 1a. Such a function and effect may also be achieved by the encoder 140 according to the third embodiment that has a similar configuration.

The encoder 160 according to the fourth embodiment includes an intermediate rotating body 22 including the second worm gear 14 and the third worm gear 30, and a direction of a reaction force applied to the intermediate rotating body 22 due to rotation of the second worm gear 14 is set to be opposite to a direction of a reaction force applied to the intermediate rotating body 22 due to rotation of the third worm gear. In such a configuration, a resultant reaction force of the reaction forces can be reduced compared to a case where directions of reaction forces are same. Such a function and effect may also be achieved by the encoder 140 according to the third embodiment that has a similar configuration.

With respect to the encoder 160 according to the fourth embodiment, an outer diameter of the first worm wheel 12 is set to be smaller than an outer diameter of the first worm gear 10. In such a configuration, thinning is easily performed compared to a case where an outer diameter of the first worm wheel 12 is larger. Such a function and effect may also be achieved by the absolute encoders 100, 120, and 140 according to the first to third embodiments each of which has a similar configuration.

The encoder 160 according to the fourth embodiment includes a housing 3 including an outer wall section 3b that is disposed on the side opposite the main spindle 1a with respect to the intermediate rotating body 22, and in a plan view, an axial line La of rotation of the intermediate rotating body 22 is inclined at an angle of 20° with respect to a direction of extension of the outer wall section 3b. In such a configuration, compared to a case where an axial line La of rotation of the intermediate rotating body 22 is not inclined, inclination of an arrangement line on which each magnet is arranged, with respect to the outer wall section 3b can be increased. As a result, a distance between magnets is increased, and thus an influence of leaked magnetic flux of adjacent magnets can be reduced. Such a function and effect may also be achieved by absolute encoders 100, 120, and 140 according to the first to third embodiments each of which has a similar configuration.

Fifth Embodiment

Figure 13:
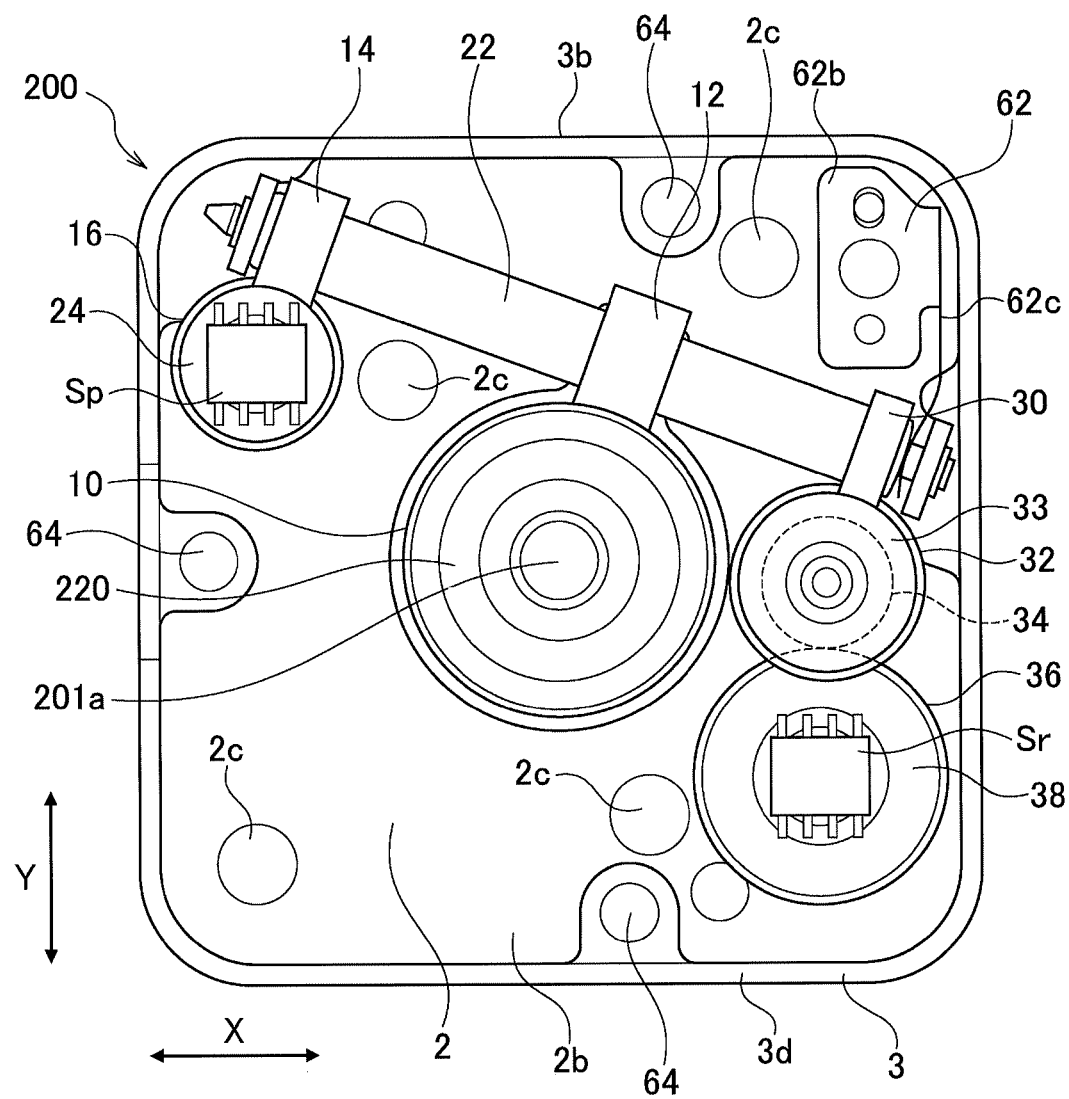
FIG. 13 is a plan view of an encoder according to a fifth embodiment of the present invention.
Figure 14:
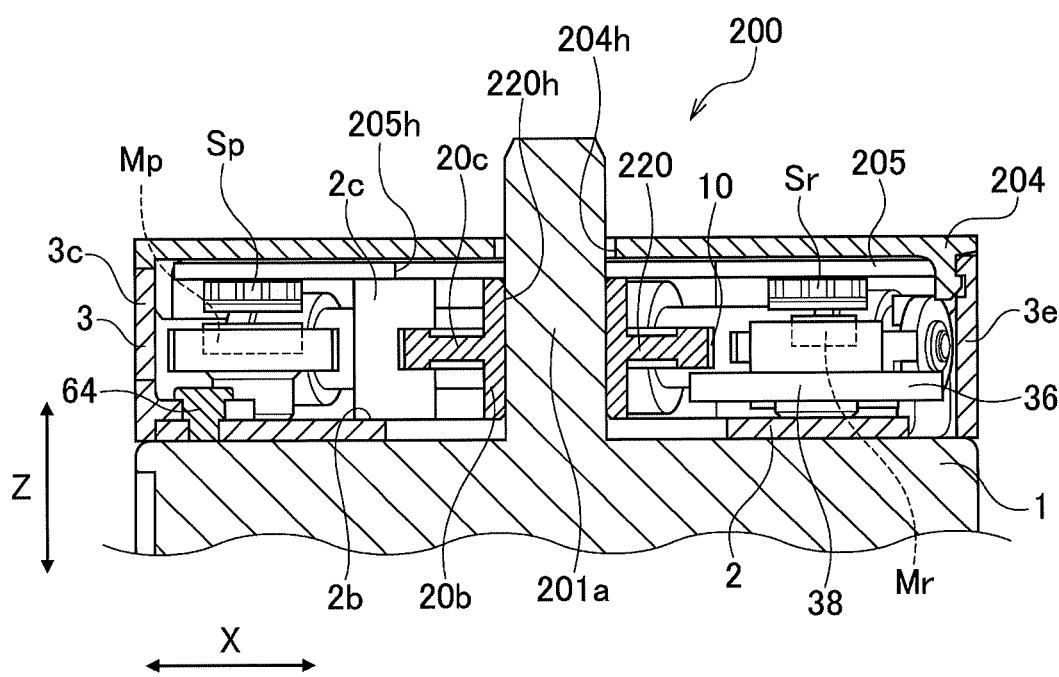
FIG. 14 is a front view with a cross-section of a portion of the encoder according to the fifth embodiment.

An encoder 200 according to the fifth embodiment will be described with reference to FIGS. 13 and 14. FIG. 13 is a plan view of the encoder 200 according to the fifth embodiment. FIG. 13 corresponds to FIG. 9. FIG. 14 is a front view of the encoder 200. FIG. 14 corresponds to FIG. 10. Unlike the encoder 160 according to the fourth embodiment, the encoder 200 does not include an angular sensor Sq and a magnet Mq, and differs in shapes of a main spindle 201a, a first rotating body 220, a substrate 205, and a lid section 204. Other configurations are the same as those described above. Duplicate explanations will be omitted for configurations that have been described in the fourth embodiment, and the configuration that differs is described. The main spindle 201a, the first rotating body 220, the substrate 205, and the lid section 204 respectively correspond to the main spindle 1a, the first rotating body 20, the substrate 5, and the lid section 4, and have similar characteristics. The main spindle 201a passes through an opening 220h provided through the first rotating body 220; an opening 205h provided through the substrate 205; and an opening 204h provided through the lid section 204, to protrude in an axial direction of being away from the motor 1. In the specification, a case where a main spindle protrudes from both sides of the motor 1, as in the encoder 200, is referred to as a double shaft. A case where a main spindle protrudes only from one side of the motor 1, as in the encoder 160, is referred to as a single shaft. The main spindle 201*a* is a solid spindle filled in cross-section.

The encoder 200 according to the fifth embodiment has the same function and effect for a portion having the same configuration as the encoder 160 according to the fourth embodiment. With respect to the encoder 200 according to the fifth embodiment, the main spindle 201*a* as an output spindle of the motor 1 has a protrusion that protrudes from the side opposite the motor 1 used in the encoder 200, and a driven load can be thereby connected to the protrusion. A configuration called double-shaft in which the main spindle 201*a* also protrudes from the side opposite the encoder 200 with respect to the motor 1 can be achieved. In such a manner, the encoder 200 can be used for various purposes.

Sixth Embodiment

Figure 15:
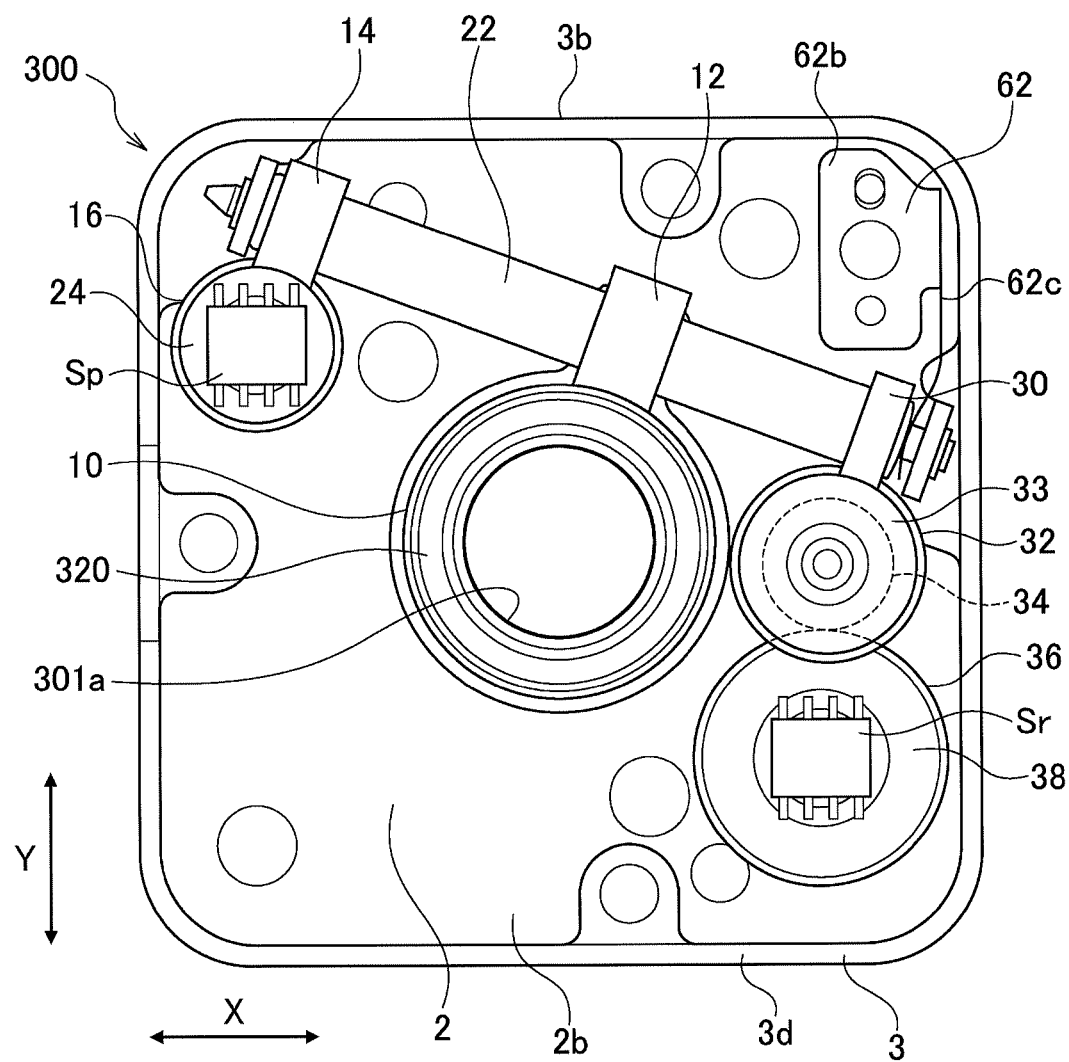
FIG. 15 is a plan view of an encoder according to a sixth embodiment of the present invention.
Figure 16:
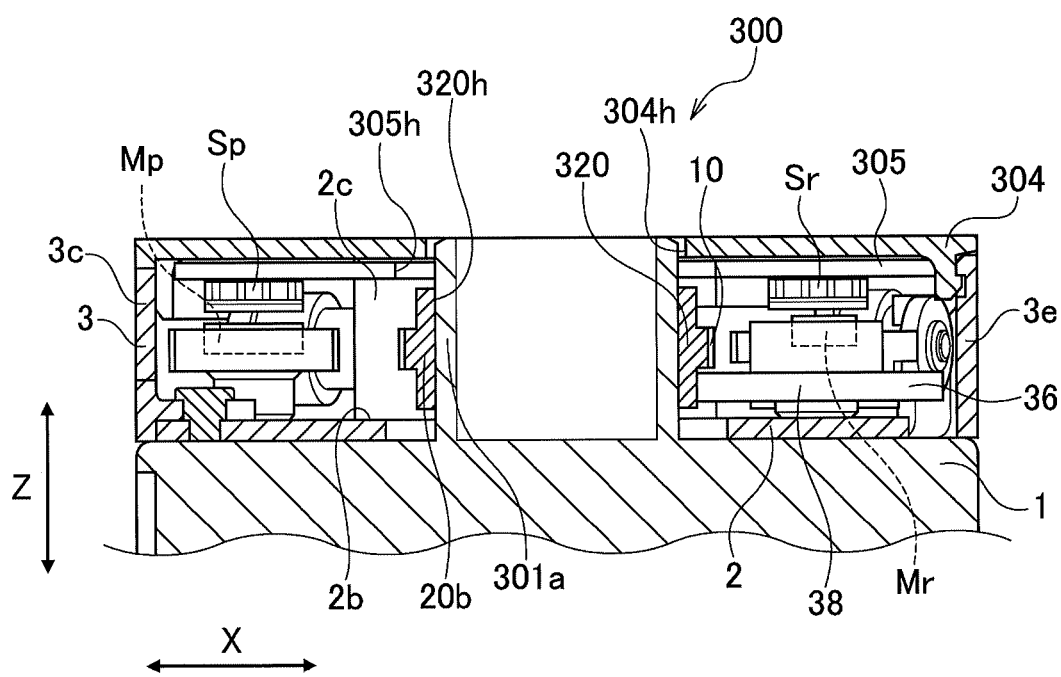
FIG. 16 is a front view with a cross-section of a portion of the encoder according to the sixth embodiment.

An encoder 300 according to a sixth embodiment will be described with reference to FIGS. 15 and 16. FIG. 15 is a plan view of the encoder 300 according to the sixth embodiment. FIG. 15 corresponds to FIG. 9. FIG. 16 is a front view of the encoder 300. FIG. 16 corresponds to FIG. 10. The encoder 300 differs from the encoder 200 according to the fifth embodiment, in shapes of a main spindle 301*a*, a first rotating body 320, a substrate 305, and a lid section 304. Other configurations are the same as those described above. Duplicate explanations will be omitted for configurations that have been described in the fourth embodiment, and the configuration that differs is described. The main spindle 301*a*, the first rotating body 320, the substrate 305, and the lid section 304 respectively correspond to the main spindle 201*a*, the first rotating body 220, the substrate 205, and the lid section 204, and have similar characteristics. The main spindle 201*a* has been described using a solid spindle. However, the main spindle 301*a* is a hollow spindle and has an outer diameter larger than the main spindle 201*a*. The main spindle 301*a* passes through an opening 320*h* provided though the first rotating body 320; an opening 305*h* provided through the substrate 305; and an opening 304*h* provided through the lid section 304. The openings 320*h*, 305*h*, and 304*h* are each larger than the openings 220*h*, 205*h*, and 204*h*, respectively, which is influenced by the main spindle 301*a* whose outer diameter is increased.

The encoder 300 according to the sixth embodiment has the same function and effect as the encoder 200 according to the fifth embodiment. With respect to the encoder 300 according to the sixth embodiment, the main spindle 301*a* as an output spindle of the motor 1 is hollow. In such a manner, a driven load can be connected to such a hollow section.

Seventh Embodiment

Figure 17:
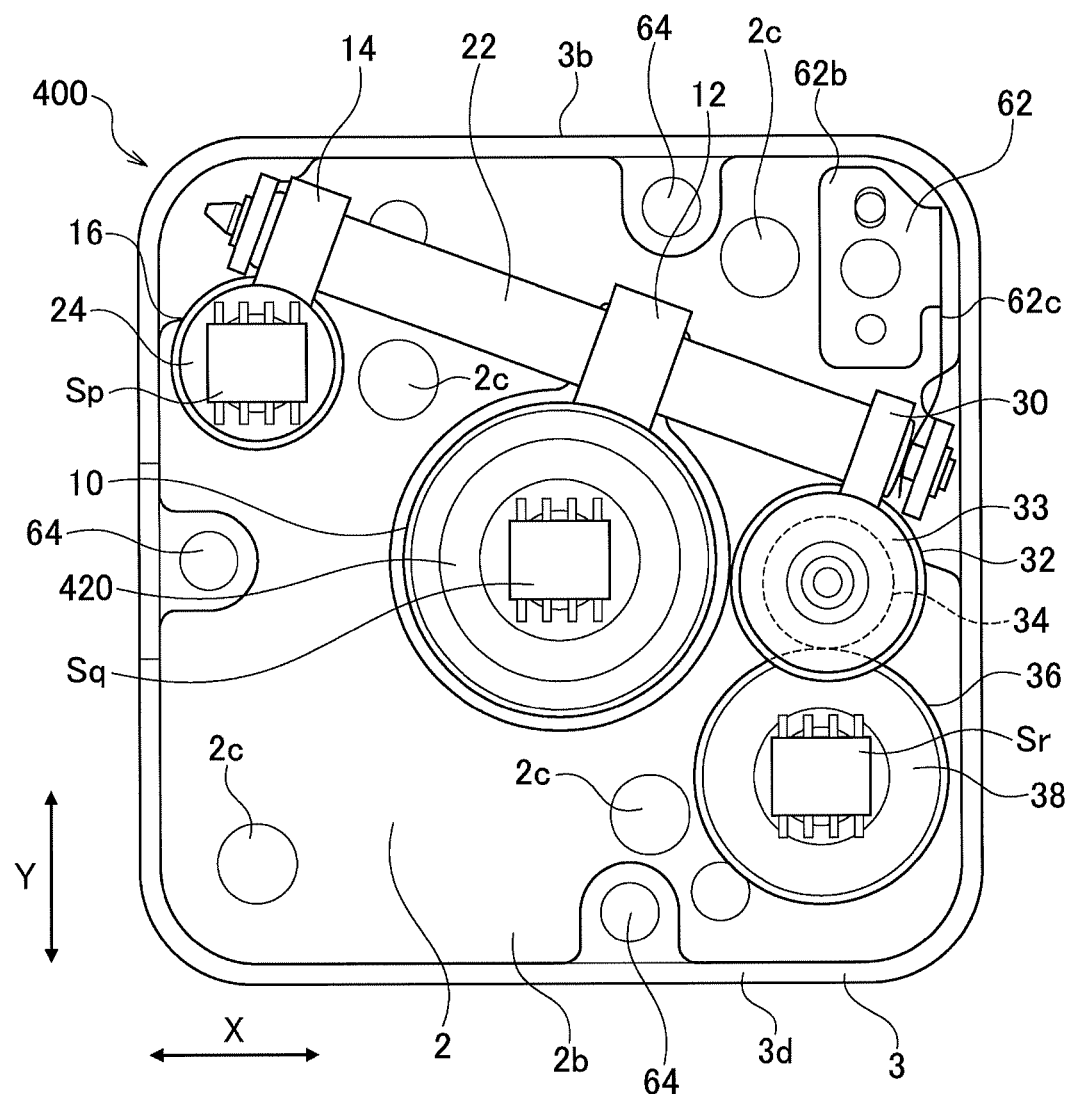
FIG. 17 is a plan view of an encoder according to a seventh embodiment of the present invention.
Figure 18:
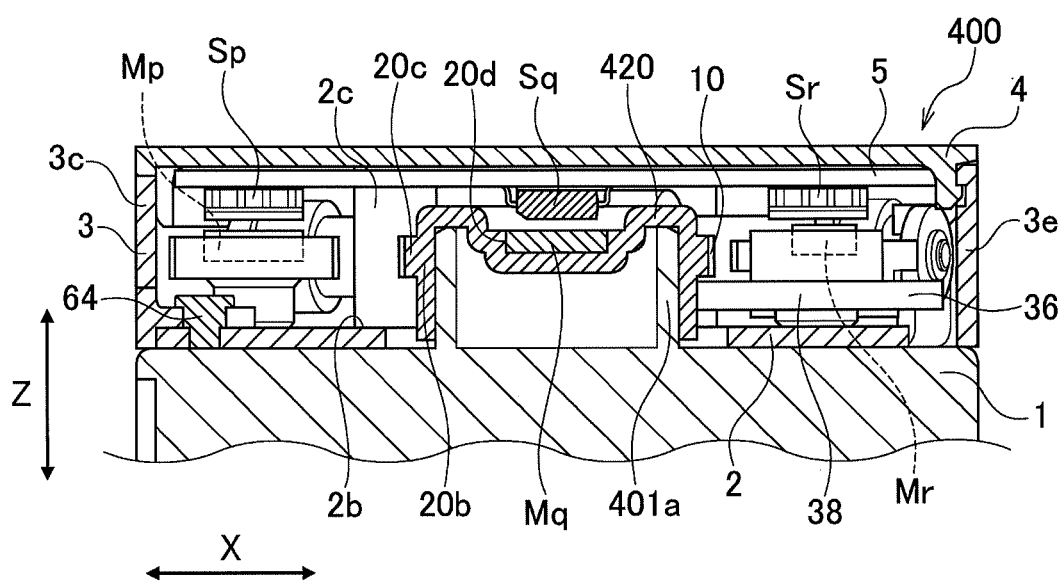
FIG. 18 is a front view with a cross-section of a portion of the encoder according to the seventh embodiment.

An encoder 400 according to a seventh embodiment will be described with reference to FIGS. 17 and 18. FIG. 17 is a plan view of the encoder 400 according to the seventh embodiment. FIG. 17 corresponds to FIG. 9. FIG. 18 is a front view of the encoder 400. FIG. 18 corresponds to FIG. 10. The encoder 400 differs from the encoder 160 according to the fourth embodiment, in shapes of a main spindle 401*a* and a first rotating body 420. Other configurations are the same as those described above. Duplicate explanations will be omitted for configurations that have been described in the fourth embodiment, and the configuration that differs is described.

The main spindle 401*a* and the first rotating body 420 respectively correspond to the main spindle 1*a* and the first rotating body 20, and have similar characteristics. The main spindle 1*a* has been described using a solid spindle. However, the main spindle 401*a* is a hollow spindle and has an outer diameter larger than the main spindle 1*a*. With respect to the first rotating body 320, an extent of an inner diameter of a portion that surrounds the main spindle 401*a* is increased, in accordance with an increase in scale of the main spindle 401*a*. The first rotating body 320 has a portion that covers an end surface of the hollow main spindle 401*a*.

The encoder 400 according to the seventh embodiment has the same function and effect as the encoder 160 according to the fourth embodiment. With respect to the encoder 400 according to the seventh embodiment, the main spindle 401*a* as an output spindle of the motor 1 is hollow. In such a manner, a driven load can be connected to such a hollow section.

Eighth Embodiment

Figure 19:
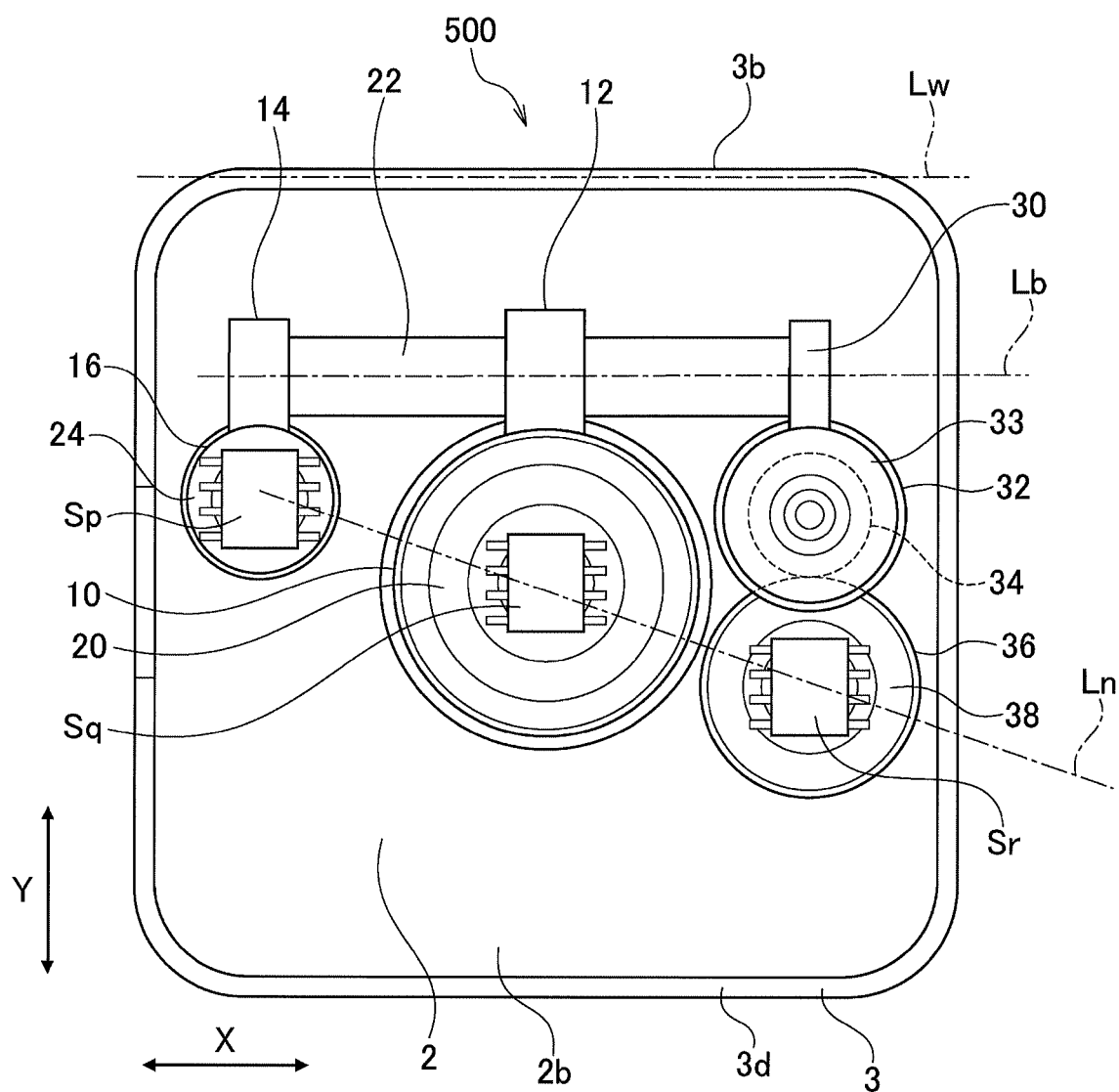
FIG. 19 is a plan view of an encoder according to an eighth embodiment of the present invention.

An encoder 500 according to an eighth embodiment will be described with reference to FIG. 19. FIG. 19 is a plan view of the encoder 500 according to the eighth embodiment. In FIG. 19, an illustration of non-significant members or portions is omitted for ease of understanding. The encoder 500 differs from the encoder 160 according to the fourth embodiment, in that an axial line Lb of rotation of an intermediate rotating body 22 is set to be parallel to a direction (X-axis direction) of extension of an outer wall section 3*b*; and with respect to such an extension direction, inclination of an arrangement line Ln on which each magnet is arranged is thereby decreased. Other configurations are the same as those described above. Duplicate explanations will be omitted for configurations that have been described in the fourth embodiment, and the configuration that differs is described. In an example of FIG. 19, with respect to a direction of extension of the outer wall section 3*b*, inclination of an arrangement line Ln on which each magnet is arranged is set to 20°.

The encoder 500 according to the eighth embodiment has the same function and effect for a portion having the same configuration as the encoder 160 according to the fourth embodiment. With respect to the encoder 500 according to the eighth embodiment, an intermediate rotating body 22 can become shorter, and the weight can be thereby reduced.

FIG. 20 is a classification table for specifications of an encoder according to each embodiment. As illustrated in FIG. 20, encoders according to the embodiments can be given various specifications. In particular, when a shape of a first rotating body is selected in a case of a basic structure being common, a specification of any combination of either of being hollow or solid; and either of a single shaft or a double shaft, can be given. In addition, with the presence or absence of an angular sensor Sq being selected, a specification of a high resolution or a medium resolution can be given with respect to a rotation angle at which a main spindle is rotated. With the presence or absence of an angular sensor Sr being selected, a specification of a wide range or a medium range can be given with respect to a detectable range of rotation amounts of a given main spindle. In other words, standardized platforms and increasingly sharable components allow for design efficiency and reductions in production costs, thereby facilitating support for various needs.

The embodiments have been described above. It would be understood by those skilled in the art that these embodiments are examples and various modifications and changes can be made within the claims; and such modifications and changes fall into the claims. Accordingly, description and drawings in the specification are not restricted, and are to be treated by way of illustration.

Hereinafter, modifications will be described. In the drawings and description in modifications, same reference numerals denote the same or similar components, or members in the embodiments.

Duplicative explanations will be approximately omitted for configurations that have been described in the embodiments. A configuration different from the embodiments will mainly be described.

First Modification

Each embodiment has been described using an integrated member as an example for each magnet. However, it is not limited thereto, and magnets Mp, Mq, and Mr may be configured as a combination of multiple pieces.

Second Modification

Each embodiment has been described using an example of gears or rotating bodies each of which is formed of a resin material. However, it is not limited thereto. All or some of such gears and rotating bodies may be formed of a metal material or other material.

In the above modifications, the same function and effect are achieved with respect to a portion having the same configuration as in each embodiment.

Any combination of the embodiments and modifications described above is also useful as a given embodiment. New embodiments through such a combination each have a combined effect of a given embodiment and modification.

As described above, the embodiments have been described using an example of an absolute encoder. However, the present invention is not limited to the embodiments as disclosed specifically, and various modifications and changes can be made without departing from the claims.

Note that this International Application claims priority to the Japanese Patent Application 2017-131231, filed Jul. 4, 2017, the contents of which are incorporated herein by reference in their entirety.

DESCRIPTION OF SYMBOLS

1 motor; 1a main spindle; 2 base; 3 housing; 10 first worm gear; 12 first worm wheel; 14 second worm gear; 16 second worm wheel; 20 first rotating body; 22 intermediate rotating body; 24 second rotating body; 30 third worm gear; 32 third worm wheel; 38 third rotating body; 40 controller; 100, 120, 140, 160 encoder.

The invention claimed is:

1. An absolute encoder for determining a rotation amount of a main spindle that rotates a plurality of revolutions, the absolute encoder comprising:
   a first drive gear configured to rotate in accordance with rotation of the main spindle;
   a first driven gear that engages with the first drive gear;
   a second drive gear configured to rotate in accordance with rotation of the first driven gear;
   a second driven gear that engages with the second drive gear;
   an angular sensor configured to detect a rotation angle at which a second rotating body is rotated in accordance with rotation of the second driven gear;
   a third drive gear configured to rotate in accordance with rotation of the first driven gear;
   a third driven gear that engages with the third drive gear:
   an intermediate rotating body provided with respect to the second drive gear and the third drive gear; and
   a second angular sensor configured to detect a rotation angle at which a third rotating body is rotated in accordance with rotation of the third driven gear;
   wherein, in a direction of an axial line of rotation of the intermediate rotating body, a direction of a reaction force applied to the intermediate rotating body due to rotation of the second drive gear is set to be opposite to a direction of a reaction force applied to the intermediate rotating body due to rotation of the third drive gear.

2. The absolute encoder according to claim 1, further comprising a third angular sensor configured to detect a rotation angle at which the main spindle is rotated.

3. The absolute encoder according to claim 1, wherein each of the second drive gear and the third drive gear is a worm gear, and
   wherein each of the second driven gear and the third driven gear is a worm wheel.

4. The absolute encoder according to claim 1, wherein the first drive gear is a worm gear,
   wherein the first driven gear is a worm wheel, and
   wherein an outer diameter of the first driven gear is set to be smaller than an outer diameter of the first drive gear.

5. The absolute encoder according to claim 2, wherein the first drive gear is a worm gear,
   wherein the first driven gear is a worm wheel, and
   wherein an outer diameter of the first driven gear is set to be smaller than an outer diameter of the first drive gear.

* * * * *